United States Patent
Jeong et al.

(10) Patent No.: US 10,430,468 B2
(45) Date of Patent: Oct. 1, 2019

(54) METHOD AND SYSTEM FOR EXTRACTING SENTENCES

(71) Applicant: UBERPLE CO., LTD., Seoul (KR)

(72) Inventors: Jaepil Jeong, Incheon (KR); Jae Yun Kim, Incheon (KR)

(73) Assignee: UBERPLE CO., LTD., Seoul (KR)

( * ) Notice: Subject to any disclaimer, the term of this patent is extended or adjusted under 35 U.S.C. 154(b) by 11 days.

(21) Appl. No.: 15/260,923

(22) Filed: Sep. 9, 2016

(65) Prior Publication Data

US 2017/0068654 A1    Mar. 9, 2017

(30) Foreign Application Priority Data

Sep. 9, 2015   (KR) .................... 10-2015-0127556

(51) Int. Cl.
*G06F 3/00* (2006.01)
*G06F 16/93* (2019.01)
*G06F 16/31* (2019.01)

(52) U.S. Cl.
CPC ............ *G06F 16/93* (2019.01); *G06F 16/313* (2019.01)

(58) Field of Classification Search
CPC ... G06F 17/30011; G06F 16/93; G06F 16/313
See application file for complete search history.

(56) References Cited

U.S. PATENT DOCUMENTS 7,017,114 B2 *  3/2006  Guo ..................... G06F 17/27
                                                707/999.001
2013/0332412 A1 * 12/2013 Amarendran ..... G06F 17/30011
                                                707/610
2016/0299881 A1 * 10/2016 Gupta .................... G06F 17/24

FOREIGN PATENT DOCUMENTS

| JP | 2010-128677 A | 6/2010 |
| KR | 10-0435442 B1 | 6/2004 |
| KR | 10-0849272 B1 | 7/2008 |
| KR | 10-1548096 B1 | 8/2015 |
| KR | 10-1549792 B1 | 9/2015 |

OTHER PUBLICATIONS

An Office Action issued by the Korean Patent Office dated Mar. 30, 2018, which corresponds to Korean Patent Application 10-2018-0032307 and is related to U.S. Appl. No. 15/260,923.

* cited by examiner

*Primary Examiner* — Kyle R Stork

(74) *Attorney, Agent, or Firm* — Studebaker & Brackett PC

(57) ABSTRACT

Methods and systems for extracting sentences are provided, one of methods comprises, receiving a keyword, parsing a document, and identifying each of a plurality of sentences included in the parsed document, configuring a graph having vertices and edges, wherein each vertex corresponds to each sentence, and each edge has a first weight corresponding to similarity between each pair of the sentences, calculating importance of each sentence by applying a modified PageRank algorithm to the graph, wherein the modified PageRank algorithm is designed to reflect a second weight corresponding to whether the keyword is included in a sentence of each vertex adjacent to a first vertex and extracting important sentences from the document based on the calculated importance.

6 Claims, 15 Drawing Sheets

⇩ REMOVE EDGES ASSIGNED WEIGHTS LOWER THAN 1

$$PR_w(C) = (1-d) + d\left(w(A)\frac{PR_w(A)}{C(A)} + w(B)\frac{PR_w(B)}{C(B)} + w(D)\frac{PR_w(D)}{C(D)} + w(E)\frac{PR_w(E)}{C(E)}\right)$$

$$= (1-0.8) + 0.8\left(0.5\frac{0.09}{3} + 1\frac{0.12}{4} + 1.9\frac{0.15}{3} + 2\frac{0.2}{4}\right)$$

$$= 0.4$$

METHOD AND SYSTEM FOR EXTRACTING SENTENCES

This application claims the benefit of Korean Patent Application No. 10-2015-0127556, filed on Sep. 9, 2015, in the Korean Intellectual Property Office, the disclosure of which is incorporated herein by reference in its entirety.

BACKGROUND

1. Field

The present inventive concept relates to a document summarization method and system, and more particularly, to a method and system for calculating the importance of each sentence included in a document and extracting important sentences from the document based on the calculated importance of each sentence.

2. Description of the Related Art

Document summarization is to generate a summary text that can represent a document. Document summarization is needed to quickly and accurately obtain necessary information from a flood of information.

A document summarization method may be divided into an extraction method and an abstraction method. The abstraction method may be more effective in summarizing an original document than the extraction method but do not ensure the consistency with the original document and the accuracy of summarization.

The extraction method is a method of extracting important sentences from a document and organizing a summary using the extracted important sentences. However, a general extraction algorithm extracts sentences evaluated as being important by absolute standards from a document without regard to a reader's point of view, interest or intention.

Therefore, an important sentence extracted according to the general extraction algorithm may be an important sentence which provides information related to the interest of a first reader but may be a sentence which provides unnecessary information to a second reader. Hence, it is required to come up with a solution which can extract sentences which can be evaluated as being important to any reader by taking the preference of each reader of the document into consideration.

SUMMARY

Aspects of the inventive concept provide a method and system for calculating the importance of each sentence included in a document based on the preference of each reader of the document and extracting important sentences from the document based on the calculated importance of each sentence.

Aspects of the inventive concept also provide a method and system for summarizing a document based on important sentences extracted from the document.

Aspects of the inventive concept also provide a content clustering method and system for performing clustering based on important sentences extracted from a document.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to one exemplary method of the present invention, a document summarization method receiving a keyword, parsing a document, and identifying each of a plurality of sentences included in the parsed document, configuring a graph having vertices and edges, wherein each vertex corresponds to each sentence, and each edge has a first weight corresponding to similarity between each pair of the sentences, calculating importance of each sentence by applying a modified PageRank algorithm to the graph, wherein the modified PageRank algorithm is designed to reflect a second weight corresponding to whether the keyword is included in a sentence of each vertex adjacent to a first vertex and extracting important sentences from the document based on the calculated importance, wherein the modified PageRank algorithm calculates importance of the first vertex based on relative importance of vertices adjacent to the first vertex, and wherein the second weight is reflected in the relative importance of vertices adjacent to the first vertex.

According to another exemplary method of the present invention, a document summarization method comprises receiving a first keyword and a second keyword, extracting k important sentences from a document having a plurality of sentences based on the first keyword, generating a first summary based on the k important sentences, extracting m important sentences from the first summary based on the second keyword, and generating a second summary based on the m important sentences.

According to other exemplary method of the present invention, a document summarization method comprises receiving a first keyword and a second keyword different from the first keyword, extracting a first important sentence from a document having a plurality of sentences based on the first keyword, extracting a second important sentence from the document based on the second keyword, and generating a summary which comprises the first important sentence and the second important sentence, wherein the first important sentence and the second important sentence are different from each other.

According to other exemplary method of the present invention, a document summarization method comprises receiving a document summarization request, which does not comprise a keyword for extracting important sentences from a document, from a user terminal, selecting a keyword, which corresponds to a preference of a user of the user terminal, based on a profile of the user, extracting important sentences from the document based on the selected keyword and generating a summary of the document based on the extracted important sentences.

According to other exemplary method of the present invention, a search service provision method comprises receiving a search keyword from a user terminal, performing a first search using the received search keyword, extracting important sentences from a document retrieved as a result of the first search and producing second search results by reorganizing the result of the first search, by reflecting whether the search keyword is included in the extracted important sentences.

According to other exemplary method of the present invention, a content clustering method comprises receiving a plurality of documents which comprise a first document and a second document, receiving a content clustering request which comprises a cluster keyword, extracting a first important sentence from the first document using the cluster keyword, extracting a second important sentence from the second document using the cluster keyword, calculating similarity between the first important sentence and the second important sentence and determining whether the first document and the second document are able to be included in one cluster based on the calculated similarity.

According to other exemplary method of the present invention, a method of extracting important sentences from a text having a plurality of sentences is provided, the method comprises extracting a first important sentence from the text based on a first keyword, extracting a second important sentence, which is different from the first important sentence, from the text based on a second keyword different from the first keyword, transmitting summary data of the text, which comprises the first important sentence and the second important sentence, to a user terminal as a summarization result of the text which corresponds to the first keyword and the second keyword.

According to other exemplary method of the present invention, a document summarization apparatus comprises a network interface, one or more processors, a memory which is loaded with a computer program to be executed by the processors and a non-transitory storage device which stores one or more files, wherein the computer program comprises an operation of receiving a keyword, an operation of parsing a document, an operation of identifying each of a plurality of sentences included in the parsed document, an operation of configuring a graph having vertices and edges, wherein each vertex corresponds to each sentence, and each edge has a first weight corresponding to similarity between each pair of the sentences, an operation of calculating importance of each sentence by applying a modified PageRank algorithm to the graph, wherein the modified PageRank algorithm is designed to reflect a second weight corresponding to whether the keyword is included in a sentence of each vertex adjacent to a first vertex and an operation of extracting important sentences from the document based on the calculated importance, wherein the modified PageRank algorithm calculates importance of the first vertex based on relative importance of vertices adjacent to the first vertex, and wherein the second weight is reflected in the relative importance of vertices adjacent to the first vertex.

According to other exemplary method of the present invention, a computer program coupled to a computing device and stored in a non-transitory recording medium is provided. The computer program executes an operation of receiving a keyword, an operation of parsing a document, an operation of identifying each of a plurality of sentences included in the parsed document, an operation of configuring a graph having vertices and edges, wherein each vertex corresponds to each sentence, and each edge has a first weight corresponding to similarity between each pair of the sentences, an operation of calculating importance of each sentence by applying a modified PageRank algorithm to the graph, wherein the modified PageRank algorithm is designed to reflect a second weight corresponding to whether the keyword is included in a sentence of each vertex adjacent to a first vertex and an operation of extracting important sentences from the document based on the calculated importance, wherein the modified PageRank algorithm calculates importance of the first vertex based on relative importance of vertices adjacent to the first vertex, and wherein the second weight is reflected in the relative importance of vertices adjacent to the first vertex.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Prior to setting forth the inventive concept in detail, certain terms used herein will be defined.

A graph is a data structure consisting of a finite set of one or more vertices and a finite set of edges, i.e., pairs of the vertices. The graph should include, but not limited to, at least one vertex.

Graphs may be divided into undirected graphs and directed graphs. An undirected graph is a graph in which pairs of vertices representing edges are unordered. That is, each edge in the undirected graph has no orientation. A directed graph is a graph in which pairs of vertices representing edges are ordered. That is, each edge in the directed graph has an orientation.

A complete graph is a graph in which the number of edges connecting n vertices is n(n−1)/2. That is, all vertices included in the complete graph are connected by edges.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the inventive concept. As used herein, the singular forms "a", "an" and "the" are intended to include the plural forms as well, unless the context clearly indicates otherwise.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Figure 1:
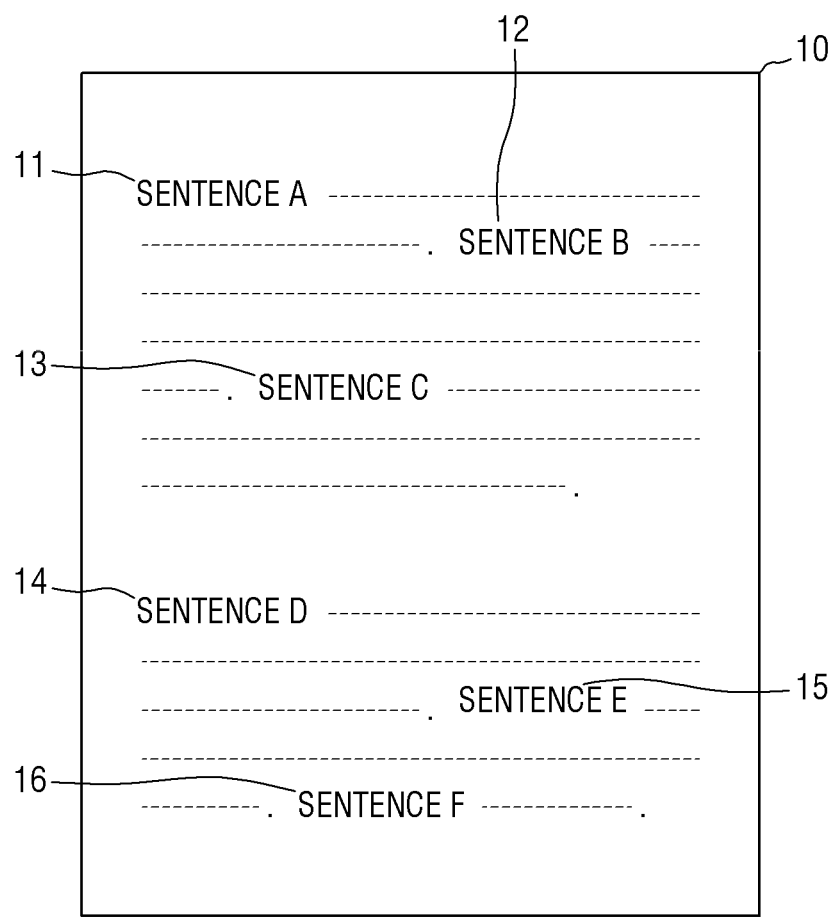
FIG. 1 illustrates the concept of sentence extraction according to an embodiment.

Hereinafter, embodiments will be described in greater detail with reference to the attached drawings. FIG. 1 illustrates the concept of important sentence extraction according to an embodiment.

Referring to FIG. 1, the important sentence extraction according to the embodiment is to calculate the importance of each sentence 11, 12, 13, 14, 15 or 16 included in a document 10 and extract important sentences from the document 10 based on the calculated importance.

For example, if the document 10 includes sentence A 11, sentence B 12, sentence C 13, sentence D 14, sentence E 15 and sentence F 16, the important sentence extraction according to the embodiment is to calculate the importance of each of sentence A 11, sentence B 12, sentence C 13, sentence D 14, sentence E 15 and sentence F 16 and extract important sentences (e.g., sentence C 13 and sentence E 15) in order of highest to lowest calculated importance. In this case, sentence C 13 and sentence E 15 are important sentences extracted from the document 10.

In particular, in the important sentence extraction according to the embodiment, important sentences are extracted from the document 10 by taking the preference of each reader of the document 10 into consideration. That is, in the important sentence extraction according to the embodiment, the importance of each sentence 11, 12, 13, 14, 15 or 16 included in the document 10 may be calculated based on the preference of each reader of the document 10, and important sentences may be extracted from the document 10 based on the calculated importance.

Therefore, in the important sentence extraction according to the embodiment, different important sentences may be extracted from the document 10 according to the preference of a reader.

Several service systems using important sentence extraction and extracted important sentences according to an embodiment will now be described with reference to FIGS. 2 through 4.

Figure 2:
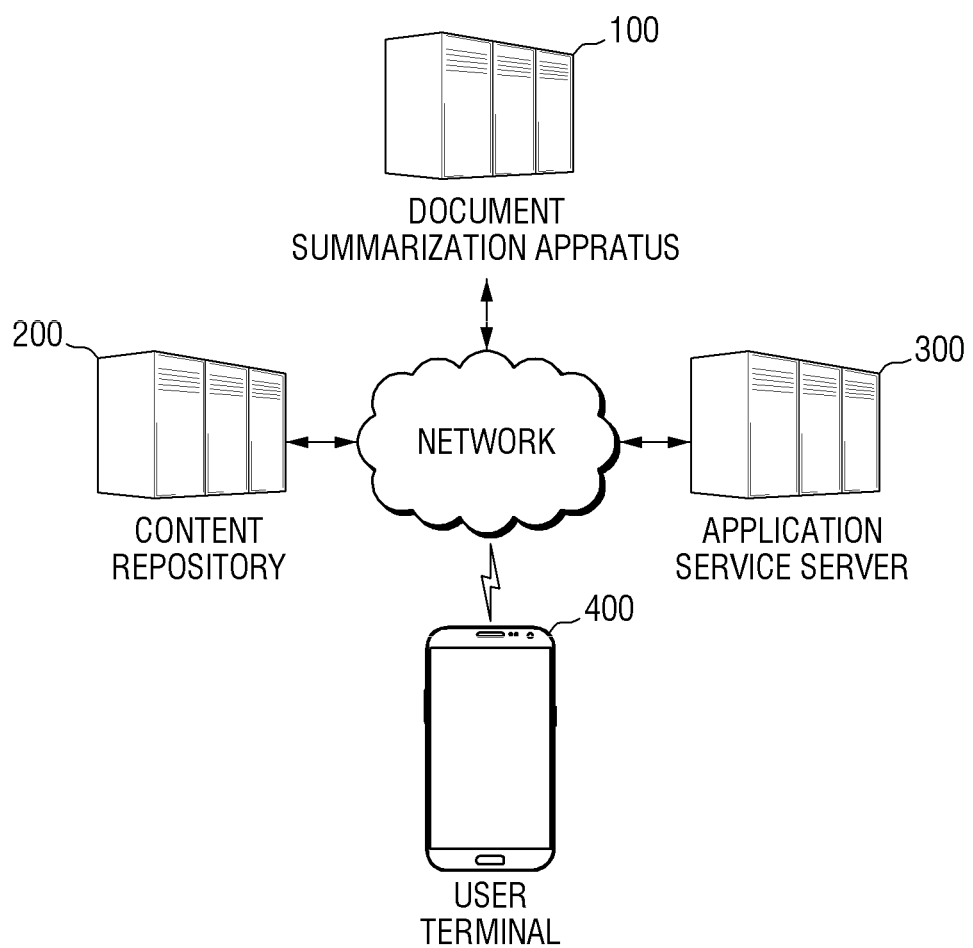
FIG. 2 illustrates a document summarization system according to an embodiment.

FIG. 2 illustrates a document summarization system according to an embodiment. Components of the document summarization system illustrated in FIG. 2 are functional components that are functionally discrete, and one or more components can be integrated with each other in an actual physical environment.

Referring to FIG. 2, the document summarization system according to the embodiment may include a document summarization apparatus 100, a content repository 200, an application service server 300, and a user terminal 400.

The document summarization apparatus 100 is an apparatus for generating a summary by summarizing a document 10. Specifically, the document summarization apparatus 100 may calculate the importance of each sentence included in the document 10 based on the preference of each reader. The document summarization apparatus 100 may extract important sentences from the document 10 based on the calculated importance of each sentence. Then, the document summarization apparatus 100 may generate a summary based on the extracted important sentences.

Here, the document 10 to be summarized may include text such as Korean letters, English letters, numbers, space characters, and special characters. However, elements that can be included in the document 10 to be summarized is not limited to text, and the document 10 to be summarized may also include images, charts, or object linking and embedding (OLE) objects.

The document summarization apparatus 100 may receive a request to summarize the document 10 from the application service server 300 or the user terminal 400. The document summarization apparatus 100 may request the content repository 200 to provide the document 10 to be summarized. The document summarization apparatus 100 may receive the document 10 to be summarized from the content repository 200. The document summarization apparatus 100 may generate a summary by extracting important sentences from the received document 10 based on the preference of each reader. Then, the document summarization apparatus 100 may transmit the generated summary to the user terminal 400, the content repository 200, or the application service server 300.

The document summarization apparatus 100 according to the embodiment may be, but is not limited to, a fixed computing device such as a server, a workstation or a desktop.

A document summarization method of the document summarization apparatus 100 according to the embodiment will be described in detail later with reference to FIGS. 5 through 8. In addition, the configuration of the document summarization apparatus 100 according to the embodiment will be described in detail later with reference to FIGS. 15 and 16.

The content repository 200 is a repository for storing various types of content. Specifically, the content repository 200 may store a document 10 to be summarized. In addition, the content repository 200 may store content for providing a search service or content to be clustered.

The content repository 200 may extract the document 10 to be summarized at the request of the document summarization apparatus 100 or the application service server 300. The content repository 200 may transmit the extracted document 10 to the document summarization apparatus 100.

The content repository 200 may extract content according to a search keyword at the request of the application service server 300. Then, the content repository 200 may transmit search results including the extracted content to the application service server 300.

In addition, the content repository 200 may extract content to be clustered according to a cluster keyword at the request of the application service server 300. Then, the content repository 200 may transmit the extracted content to be clustered to the application service server 300.

The application service server 300 is a server for providing various services based on content stored in the content repository 200 and summaries generated by the document summarization apparatus 100.

Specifically, the application service server 300 may receive a search keyword from the user terminal 400. The application service server 300 may request the content repository 200 to provide search results according to the search keyword. The application service server 300 may receive the search results from the content repository 200.

When a document 10 including a plurality of sentences exists in the search results received from the content repository 200, the application service server 300 may request the document summarization apparatus 100 to summarize the document 10. The application service server 300 may receive a summary of the document 10 from the document summarization apparatus 100.

The application service server 300 may reorganize the search results based on received summaries. For example, when the search keyword is not included in a summary, the application service server 300 may reorganize the search results by excluding a document, which is the original of the summary, from the search results. In addition, the application service server 300 may reorganize the search results by excluding a document whose summary has relatively low similarity to other summaries from the search results. The application service server 300 may transmit the reorganized search results to the user terminal 400.

In addition, the application service server 300 may receive a cluster keyword from the user terminal 400. The application service server 300 may request the content repository 200 to provide content to be clustered according to the cluster keyword. The application service server 300 may receive the content to be clustered from the content repository 200.

When a document 10 including a plurality of sentences exists in the content to be clustered, the application service server 300 may request the document summarization apparatus 100 to summarize the document 10. The application service server 300 may receive a summary of the document 10 from the document summarization apparatus 100.

The application service server 300 may cluster the content to be clustered based on summaries received from the document summarization apparatus 100. For example, the application service server 300 may calculate the similarity between summaries of the content to be clustered and determine whether the content to be clustered can be included in one cluster based on the calculated similarity. Then, the application service server 300 may transmit the clustering result to the user terminal 400.

The user terminal 400 is a device that can request document summarization, keyword search or content clustering. Specifically, the user terminal 400 may request the document summarization apparatus 100 to summarize a document 10. Then, the user terminal 400 may receive a summary from the document summarization apparatus 100 and output the received summary.

The user terminal 400 may also request keyword search by transmitting a search keyword to the application service server 300. Then, the user terminal 400 may receive search results from the application service server 300 and output the received search results.

The user terminal 400 may request content clustering by transmitting a cluster keyword to the application service server 300. Then, the user terminal 400 may receive the clustering result from the application service server 300 and output the received clustering result.

The user terminal 400 according to the embodiment may be any device capable of transmitting and receiving data through a network. For example, the user terminal 400 according to the embodiment may be any one of a mobile computing device such as a smartphone, a laptop, a tablet, a phablet or a personal digital assistant (PDA) and a fixed computing device such as a desktop, a server or a workstation. The user terminal 400 may also be any one of wearable computing devices such as smart glasses, a smart band, a smart watch and a smart ring.

Lastly, a network is infrastructure used by the document summarization apparatus 100, the content repository 200, the application service server 300 and the user terminal 400 to transmit and receive data. The network according to the embodiment may be, but is not limited to, a combination of one or more of a wired communication network such as Ethernet, X Digital Subscriber Line (xDSL), hybrid fiber coax (HFC) or Fiber To The Home (FTTH), a mobile communication network such as Code Division Multiple Access (CDMA), Wideband CDMA (WCDMA), Global System for Mobile communication (GSM), High Speed Packet Access (HSPA) or Long Term Evolution (LTE), and a local area wireless communication network such as WiFi, Wimax, Wibro, Bluetooth or Zigbee.

Figure 3:
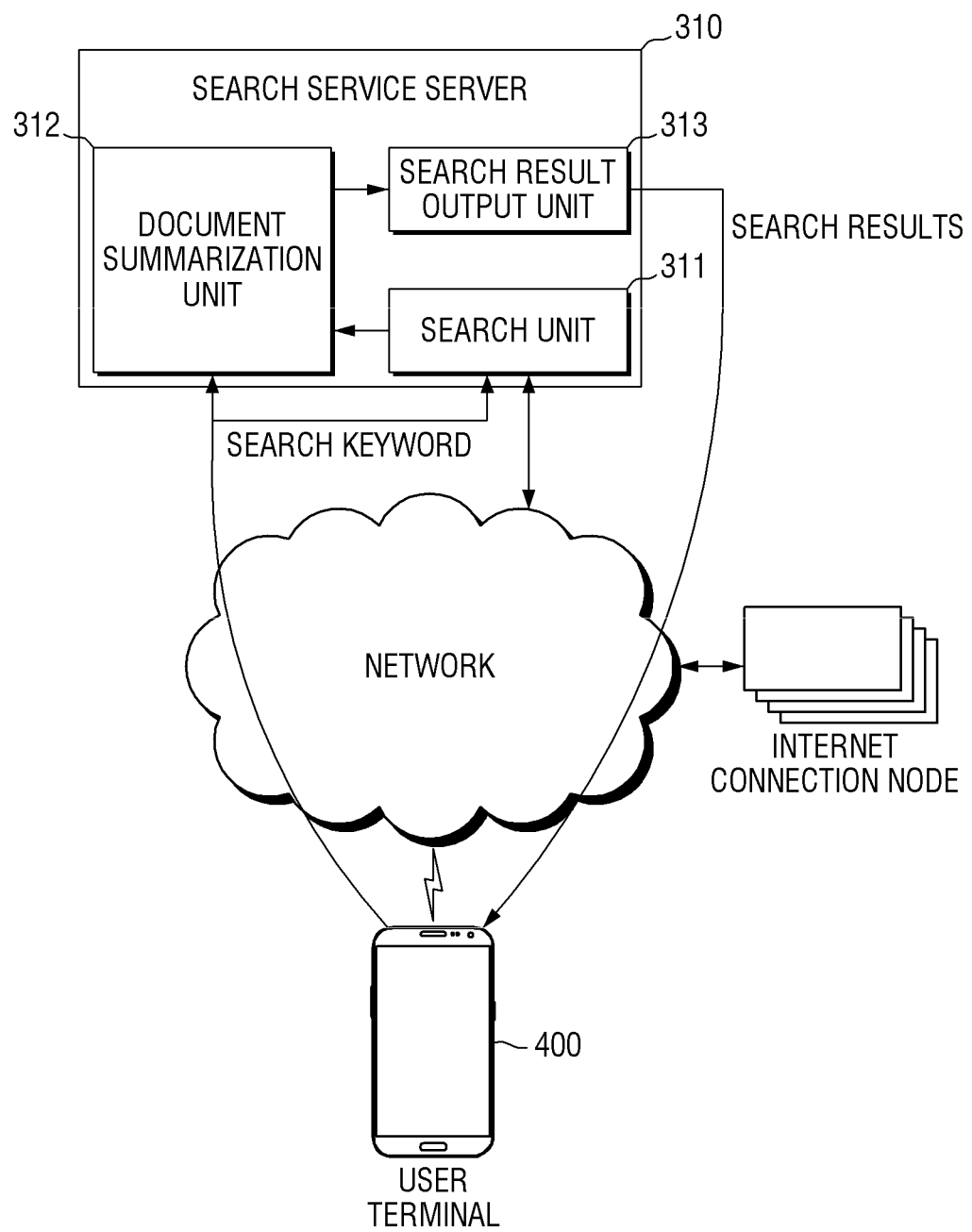
FIG. 3 illustrates a search service system according to an embodiment.

FIG. 3 illustrates a search service system according to an embodiment. Referring to FIG. 3, the search service system according to the embodiment may be implemented as a single apparatus for providing a search service into which the document summarization apparatus 100, the content repository 200 and the application service server 300 are integrated.

A search service server 310 is an apparatus for providing a search service. The search service server 310 may include a search unit 311, a document summarization unit 312, and a search result output unit 313.

The search unit 311 may receive a keyword search request including a search keyword from the user terminal 400. The search unit 311 may search for content according to the received search keyword. In this case, the search unit 311 may also search for content stored in an external repository through the network. The search unit 311 may generate search results including the found content.

When a document 10 including a plurality of sentences exists in the search results generated by the search unit 311, the document summarization unit 312 may calculate the importance of each sentence included in the document 10 based on the keyword received from the user terminal 400. The document summarization unit 312 may extract important sentences from the document 10 based on the calculated importance of each sentence. The document summarization unit 312 may generate a summary based on the extracted important sentences.

The search result output unit 313 may reorganize the search results generated by the search unit 311 based on summaries generated by the document summarization unit 312. For example, when the search keyword is not included in a summary, the search result output unit 313 may reorganize the search results by excluding a document, which is the original of the summary, from the search results. In addition, the search result output unit 313 may reorganize the search results by excluding a document whose summary has relatively low similarity to other summaries from the search results. The search result output unit 313 may transmit the reorganized search results to the user terminal 400.

Figure 4:
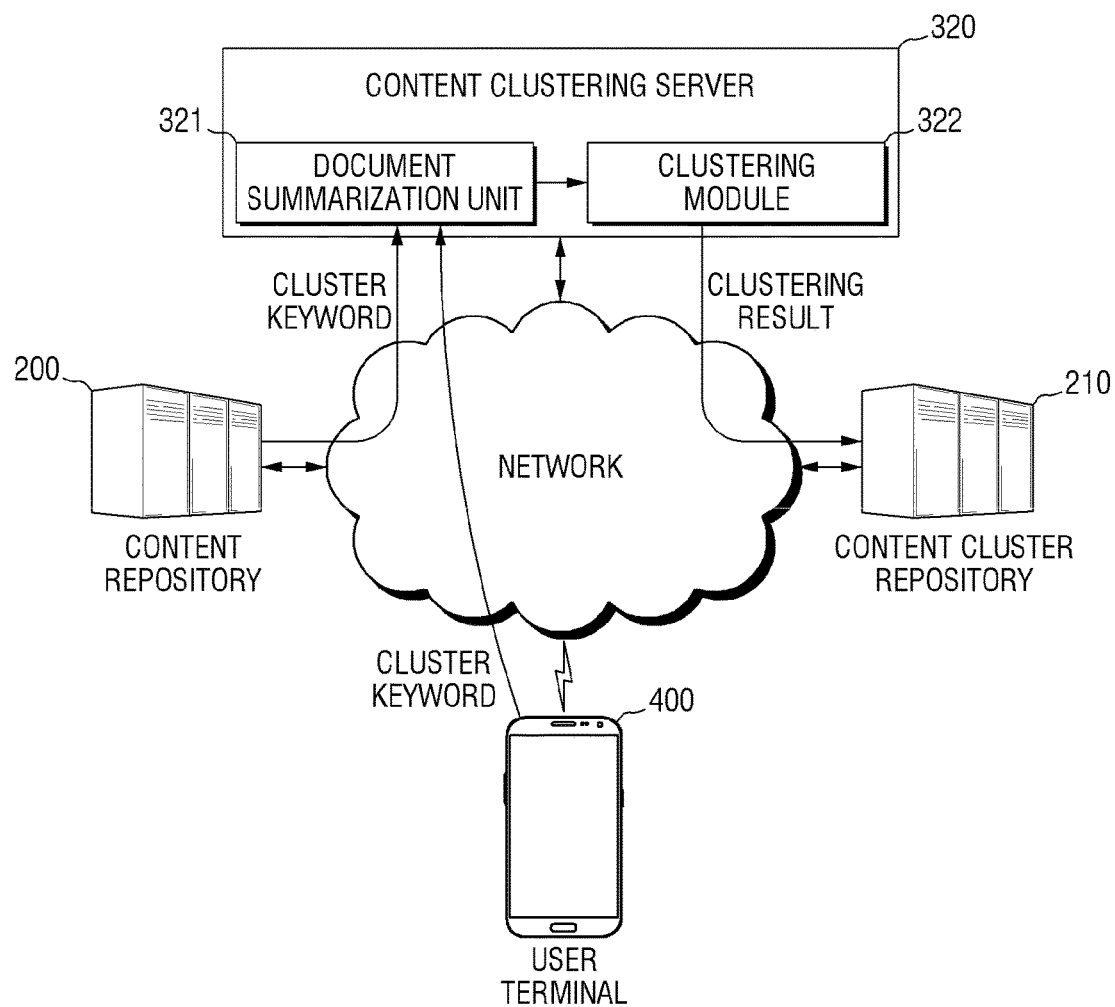
FIG. 4 illustrates a content clustering system according to an embodiment.

FIG. 4 illustrates a content clustering system according to an embodiment. Referring to FIG. 4, the content clustering system according to the embodiment may be implemented as a single apparatus for performing clustering into which the document summarization apparatus 100 and the application service server 300 are integrated.

A content clustering server 320 is an apparatus for performing clustering. The content clustering server 320 may include a document summarization unit 321 and a clustering module 322.

The document summarization unit 321 may receive a content clustering request including a cluster keyword from the content repository 200 or the user terminal 400. When a document 10 including a plurality of sentences exists in content to be clustered, the document summarization unit 321 may calculate the importance of each sentence included in the document 10 based on the received cluster keyword. The document summarization unit 321 may extract important sentences from the document 10 based on the calculated importance of each sentence. The document summarization unit 312 may generate a summary based on the extracted important sentences.

The clustering module 322 may cluster the content to be clustered based on summaries generated by the document summarization unit 321. For example, the clustering module 322 may calculate the similarity between summaries of the content to be clustered and determine whether the content to be clustered can be included in one cluster based on the calculated similarity. Then, the clustering module 322 may transmit the clustering result to a content cluster repository 210.

In summary, the document summarization system according to the embodiment may extract important sentences for generating a summary by considering the preference of a reader. Therefore, the document summarization system can generate a customized summary that suits the reader's point of view, interest or intention. In addition, the search service system can provide a customized search service for each reader by reorganizing keyword search results using important sentences extracted according to the preference of each reader. Further, the content clustering system can perform customized clustering for each reader by clustering content using important sentences extracted according to the preference of each reader.

That is, the document summarization system may extract a first important sentence from a text based on a first keyword and transmit to a user terminal data about the first important sentence as a summarization result of the text which corresponds to the first keyword. In addition, the document summarization system may extract a second important sentence, which is different from the first important sentence, from the text based on a second keyword different from the first keyword and transmit to the user terminal data about the second important sentence as a summarization result of the text which corresponds to the second keyword. Conventional important sentence extraction technology fails to reflect personalized importance in the extraction of important sentences. On the other hand, according to the inventive concept, personalized importance is reflected in the form of keywords. As a result, the result of extracting important sentences based on a first keyword is different from the result of extracting important sentences based on a second keyword.

Figure 5:
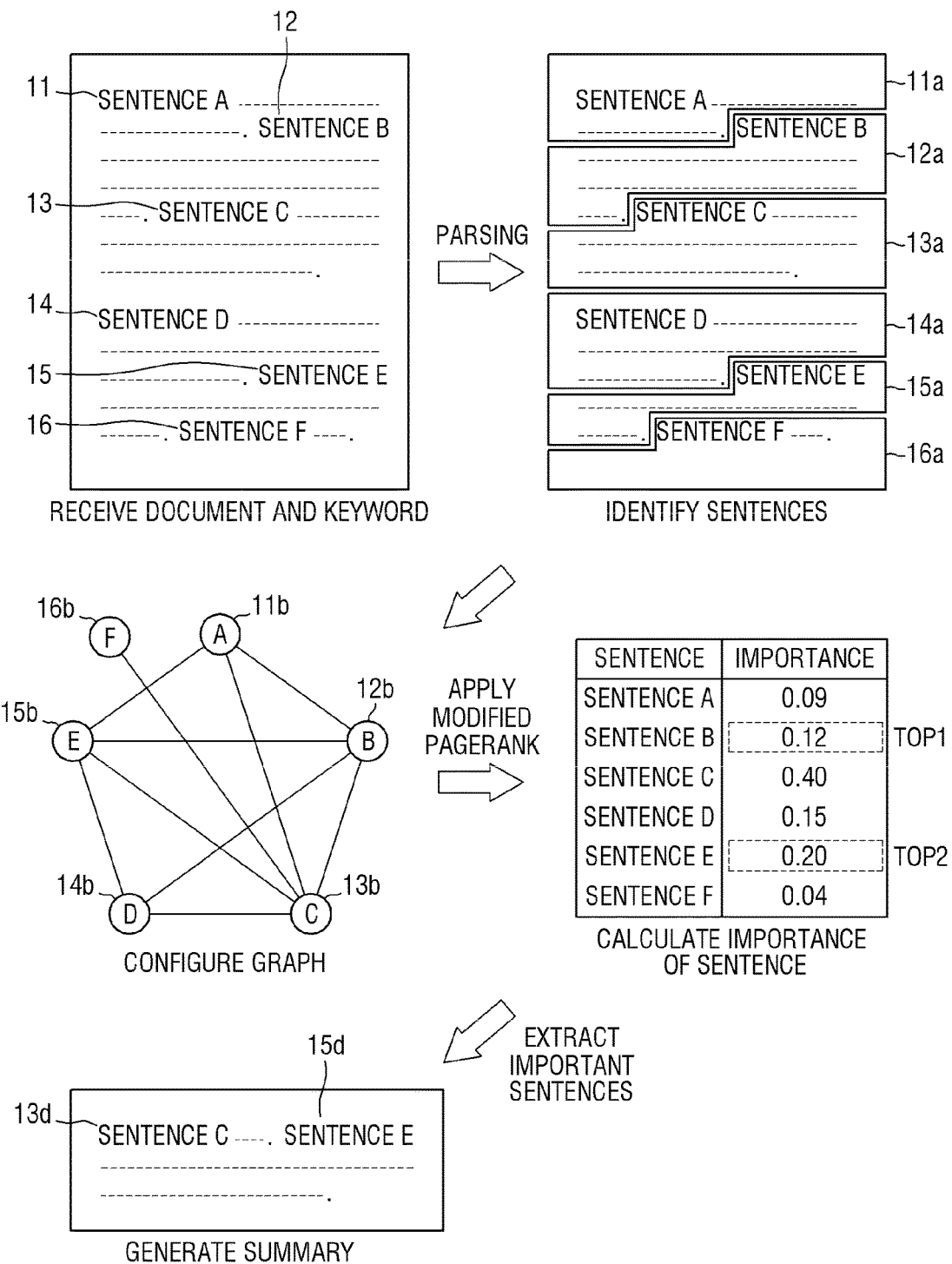
FIG. 5 is a conceptual diagram illustrating a document summarization process according to an embodiment.

A document summarization method of the document summarization apparatus 100 according to an embodiment will now be described with reference to FIGS. 5 through 8. FIG. 5 is a conceptual diagram illustrating a document summarization process according to an embodiment.

Referring to FIG. 5, the document summarization apparatus 100 receives a document 10 to be summarized from the content repository 200. The document 10 received by the document summarization apparatus 100 may include one or more sentences 11 through 16.

The document summarization apparatus 100 receives one or more keywords from the content repository 200 or the user terminal 400. Here, the keywords are words used to apply the preference of each reader to extracting important sentences from the document 10. Therefore, the keywords may be words that can express each reader's point of view, interest or intention.

The document summarization apparatus 100 identifies sentence A 11a, sentence B 12a, sentence C 13a, sentence D 14a, sentence E 15a and sentence E 16a included in the document 10 by parsing the received document 10.

The document summarization apparatus 100 configures a graph having the identified sentence A 11b, sentence B 12b, sentence C 13b, sentence D 14b, sentence E 15b and sentence F 16b as vertices and the similarity between each pair of the sentences as a weight of an edge. The graph configured by the document summarization apparatus 100 may be, but is not limited to, an undirected graph.

The document summarization apparatus 100 calculates the importance of each sentence by applying a modified PageRank algorithm to the configured graph.

Here, the modified PageRank algorithm calculates the importance of a first vertex based on the relative importance of vertices adjacent to the first vertex, wherein a weight related to whether a keyword is included in a sentence of each vertex adjacent to the first vertex is reflected in the relative importance of each vertex adjacent to the first vertex. That is, the modified PageRank algorithm calculates the relative importance of each vertex included in the graph in view of the relevance of each vertex to the keyword.

The document summarization apparatus 100 extracts important sentences (e.g., sentence C 13d and sentence E 15d) from the document 10 including sentence A 11, sentence B 12, sentence C 13, sentence D 14, sentence E 15 and sentence F 16 in order of highest to lowest calculated importance. The number of important sentences extracted by the document summarization apparatus 100 may be preset in the document summarization apparatus 100 or designated by the user terminal 400 which requested the summarization of the document 10.

The document summarization apparatus 100 generates a summary by rearranging the important sentences (e.g., sentence C 13d and sentence E 15d) based on locations of the important sentences in the document 10.

Figure 6:
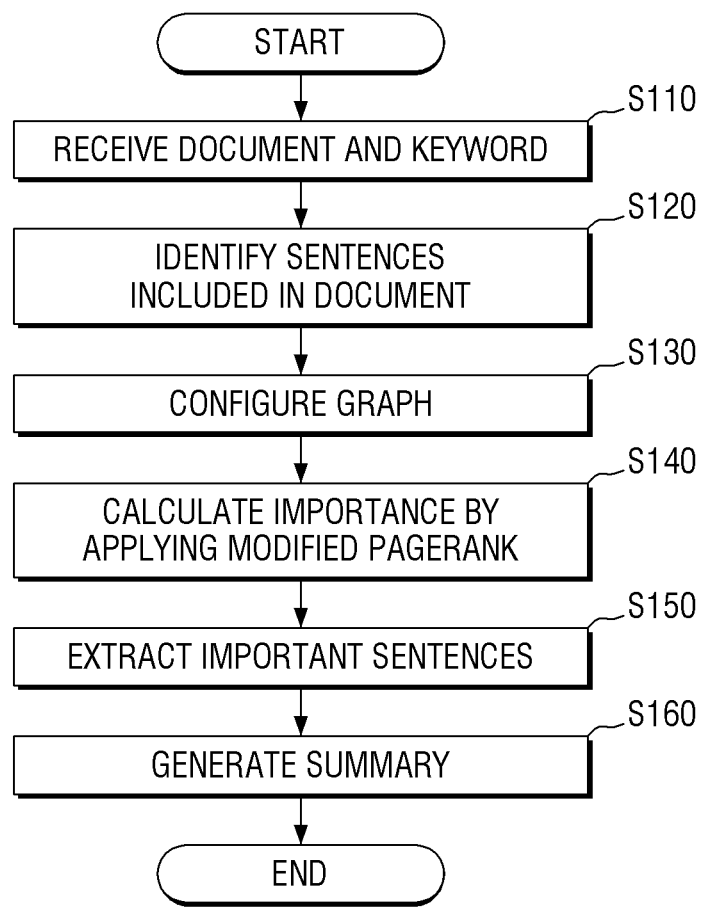
FIG. 6 is a flowchart illustrating a document summarization method according to an embodiment.

FIG. 6 is a flowchart illustrating a document summarization method according to an embodiment.

Referring to FIG. 6, the document summarization apparatus 100 receives a document 10 to be summarized from the content repository 200 and receives one or more keywords from the content repository 200 or the user terminal 400 (operation S110).

Here, the document 10 to be summarized may include text such as Korean letters, English letters, numbers, space characters, and special characters. However, elements that can be included in the document 10 to be summarized are not limited to text, and the document 10 to be summarized may also include images, charts, or OLE objects. In addition, the keywords are words used to apply the preference of each reader to extracting important sentences from the document 10. Therefore, the keywords may be words that can express each reader's point of view, interest or intention.

The document summarization apparatus 100 identifies each of a plurality of sentences included in the document 10 by parsing the received document 10 (operation S120). Specifically, the document summarization apparatus 100 may identify final endings included in the document 10 and identify each sentence included in the document 10 based on the identified final endings. However, the inventive concept is not limited thereto, and the document summarization apparatus 100 may identify marks such as periods, question marks, commas, etc. included in the document 10 and identify each sentence included in the document 10 based on the identified marks.

The document summarization apparatus 100 configures a graph having each identified sentence as a vertex and the similarity between each pair of the sentences as a weight of an edge (operation S130). The graph configured by the document summarization apparatus 100 may be, but is not limited to, an undirected graph.

The document summarization apparatus 100 according to the embodiment may configure a graph by removing some edges from a complete graph.

Specifically, the document summarization apparatus 100 configures a complete graph having each identified sentence as a vertex and all vertices connected by edges. In addition, the document summarization apparatus 100 calculates the similarity between each pair of the sentences.

The document summarization apparatus 100 according to the embodiment may calculate the similarity between sentences using any one of Jaccard coefficient and Hamming distance. However, the inventive concept is not limited thereto, and the document summarization apparatus 100 can also calculate the similarity between sentences using any one of Tanimoto similarity and cosine similarity.

The document summarization apparatus 100 assigns the calculated similarity as a weight of an edge that connects each pair of the vertices. In addition, the document summarization apparatus 100 removes from the graph edges assigned weights lower than a threshold value.

Here, the threshold value is a value indicating minimum similarity existing between two correlated sentences. The threshold value may be set to, e.g., one. In addition, the threshold value may be preset in the document summarization apparatus 100 or designated by the user terminal 400 which requested the summarization of the document 10.

A document summarization apparatus 100 according to an embodiment may configure a graph by assigning edges to a graph composed only of vertices.

Specifically, the document summarization apparatus 100 configures a graph having each identified sentence as a vertex. The document summarization apparatus 100 identifies important tokens by parsing each sentence. Here, the tokens are parts for expressing substantial meanings of words included in each sentence. The tokens may be, e.g., roots or stems included in each sentence.

When the same token is included in sentences of two vertices of the graph, the document summarization apparatus 100 assigns an edge between the two vertices. When all tokens included in the sentences of the two vertices of the graph are not the same, the document summarization apparatus 100 does not assign an edge between the two vertices. A graph generation process of the document summarization apparatus 100 according to an embodiment will be described in greater detail later with reference to FIG. 7.

The document summarization apparatus 100 calculates the importance of each sentence by applying a modified PageRank algorithm to the configured graph (operation S140). Here, the modified PageRank algorithm calculates the importance of a first vertex based on the relative importance of vertices adjacent to the first vertex, wherein a weight related to whether a keyword is included in a sentence of each vertex adjacent to the first vertex is reflected in the relative importance of each vertex adjacent to the first vertex. That is, the modified PageRank algorithm calculates the relative importance of each vertex included in the graph in view of the relevance of each vertex to the keyword.

Specifically, a PageRank algorithm is an algorithm of calculating the importance of a first document based on the importance of other documents which cite the first document. The PageRank algorithm may be expressed as Equation (1) below:

$$PR(A) = (1-d) + d\left(\frac{PR(T_1)}{C(T_1)} + \ldots + \frac{PR(T_n)}{C(T_n)}\right), \quad (1)$$

where $T_n$ is a document that cites document A. In addition, $PR(T_n)$ is importance calculated by applying the PageRank algorithm to the document $T_n$. That is, $PR(T_n)$ is a PageRank value of $T_n$. $C(T_n)$ is the number of documents that cite the document $T_n$. In addition, d is a probability that a reader or a web surfer will search for other documents without being satisfied with document A. d serves as a damping factor and may be set to 0.85.

To calculate the importance $PR_w(A)$ of sentence A, the document summarization apparatus 100 may apply Equation (2) which is a modified version of the above-described PageRank algorithm:

$$PR_w(A) = (1-d) + d\left(w(T_1)\frac{PR_w(T_1)}{C(T_1)} + \ldots + w(T_n)\frac{PR_w(T_n)}{C(T_n)}\right), \quad (2)$$

where $T_n$ is a vertex connected to a vertex which corresponds to sentence A. In addition, $PR_w(T_n)$ is importance calculated by applying the modified PageRank algorithm to the vertex $T_n$. That is, $PR_w(T_n)$ is a PageRank value of the vertex $T_n$. A document summarization apparatus 100 according to an embodiment may substitute an arbitrary number for an initial value of $PR_w(T_n)$ and iteratively perform the modified PageRank algorithm until $PR_w(T_n)$ converges on a specific value. However, a document summarization appratus 100 according to an embodiment may substitute w $(T_n)$ for an initial value of $PR_w(T_n$ and iteratively perform the modified PageRank algorithm until $PR_w(T_n)$ converges on a specific value. In this case, the document summarizatin apparatus 100 will be able to calculate $PR_w(T_n)$ by performing the modified PageRank algorithm a reduced number of times.

$C(T_n)$ is the number of edges attached to the vertex $T_n$. In addition, d is a probability that a reader will search for other documents without being satisfied with document A. d serves as a damping factor and may be set to, but not limited to, 0.85.

In addition, w $(T_n)$ is a weight given according to the relevance of a sentence corresponding to the vertex $T_n$ to a keyword. A document summarization apparatus 100 according to an embodiment may determine w $(T_n)$ according to the frequency of appearance of the keyword in the sentence corresponding to the vertex $T_n$. For example, the document summarization apparatus 100 may set w $(T_n)$ to a greater value as the frequency of appearance of the keyword in the sentence corresponding to the vertex $T_n$ increases and to a smaller value as the frequency of appearance of the keyword in the sentence corresponding to the vertex $T_n$ decreases. In addition, a document summarization apparatus 100 according to an embodiment may determine w $(T_n)$ according to a location at which the keyword appears in the sentence corresponding to the vertex $T_n$. For example, a total of 20 tokens may be included in the sentence corresponding to the vertex $T_n$, and the keyword may appear at a fourth location from the beginning of the sentence. In this case, the document summarization apparatus 100 may set w $(T_n)$ to a value corresponding to top 20%. In addition, the document summarization apparatus 100 may linearly determine w $(T_n)$ according to the relevance of the sentence corresponding to the vertex $T_n$ to the keyword. However, the inventive concept is not limited thereto, and the document summarization apparatus 100 can also non-linearly determine w $(T_n)$ according to the relevance of the sentence corresponding to the vertex $T_n$ to the keyword.

The process of applying the modified PageRank algorithm by the document summarization apparatus 100 according to an embodiment will be described in greater detail later with reference to FIG. 8.

The document summarization apparatus 100 extracts important sentences from the document 10 based on the calculated importance (operation S150). Specifically, the document summarization apparatus 100 may extract one important sentence with highest importance from the document 10. Alternatively, the document summarization apparatus 100 may extract k important sentences from the document 10 in order of highest to lowest calculated importance. Here, the number k of important sentences extracted by the document summarization apparatus 100 may be preset in the document summarization apparatus 100 or designated by the user terminal 400 which requested the summarization of the document 10.

The document summarization apparatus 100 generates a summary using the extracted important sentences (operation S160). Specifically, when one important sentence is extracted from the document 10, the document summarization apparatus 100 may select sentences of vertices which are connected to a vertex of the extracted important sentence by edges. Then, the document summarization apparatus 100 may generate a summary using the extracted important sentence and the selected sentences.

The document summarization apparatus 100 may select sentences to be used to generate a summary from the sentences of the vertices, which are connected to the vertex of the one important sentence by the edges, based on any one or more of importance, similarity and length. For example, the document summarization apparatus 100 may select k sentences from the sentences of the vertices connected to the one important sentence by the edges in order of highest to lowest importance calculated by applying a modified PageRank algorithm. Alternatively, the document summarization apparatus 100 may select k sentences from the sentences of the vertices connected to the one important sentence by the edges in order of highest to lowest similarity to the one important sentence. Alternatively, the document summarization apparatus 100 may select k sentences from the sentences of the vertices connected to the one important sentence by the edges in order of longest to shortest sentence length.

In addition, when k important sentences are extracted from the document 10, the document summarization apparatus 100 may generate a summary by rearranging the k extracted important sentences based on locations of the important sentences in the document 10.

Figure 7:
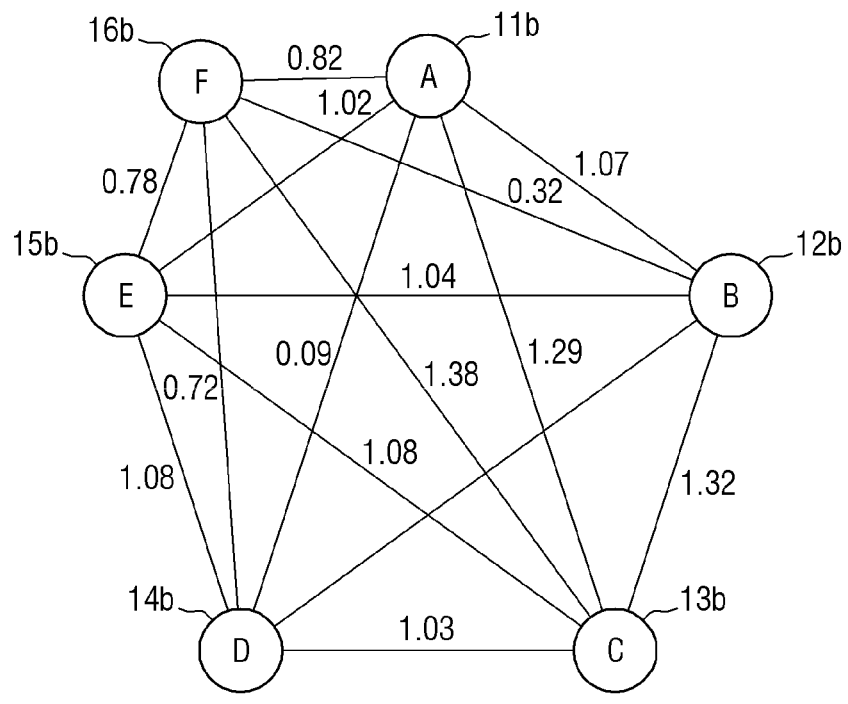
FIG. 7 illustrates a graph generation process in the document summarization method of FIG. 6.
Figure 7:
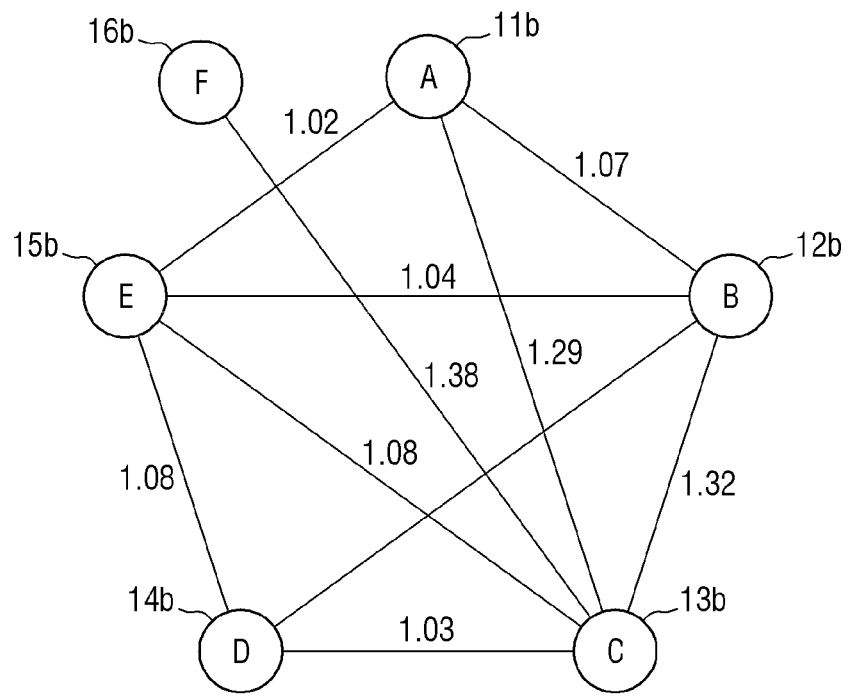

FIG. 7 illustrates a graph generation process in the document summarization method of FIG. 6. In the graph generation process of FIG. 7, it is assumed that a graph is generated based on the document 10 illustrated in FIG. 1.

Referring to FIG. 7, the document summarization apparatus 100 configures a complete graph having sentence A 11b, sentence B 12b, sentence C 13b, sentence D 14b, sentence E 15b and sentence F 16b included in the document 10 as vertices and having all vertices connected to each other by edges.

The document summarization apparatus 100 calculates similarity values between sentence A 11b, sentence B 12b, sentence C 13b, sentence D 14b, sentence E 15b and sentence F 16b. The similarity values calculated by the document summarization apparatus 100 are as shown in Table 1 below.

TABLE 1

| Sentence | Edge | Similarity |
|---|---|---|
| Sentence A, Sentence B | (A, B) | 1.07 |
| Sentence A, Sentence C | (A, C) | 1.29 |
| Sentence A, Sentence D | (A, D) | 0.09 |
| Sentence A, Sentence E | (A, E) | 1.02 |
| Sentence A, Sentence F | (A, F) | 0.82 |
| Sentence B, Sentence C | (B, C) | 1.32 |
| Sentence B, Sentence D | (B, D) | 1.27 |
| Sentence B, Sentence E | (B, E) | 1.04 |
| Sentence B, Sentence F | (B, F) | 0.32 |
| Sentence C, Sentence D | (C, D) | 1.03 |
| Sentence C, Sentence E | (C, E) | 1.08 |
| Sentence C, Sentence F | (C, F) | 1.38 |
| Sentence D, Sentence E | (D, E) | 1.08 |
| Sentence D, Sentence F | (D, F) | 0.72 |
| Sentence E, Sentence F | (E, F) | 0.78 |

The document summarization apparatus 100 assigns the calculated similarity values as weights of the edges that connect the vertices.

The document summarization apparatus 100 removes edges (A, F), (A, D), (B, F), (D, F) and (E, F) given weights lower than a threshold value of 1.

Figure 8:
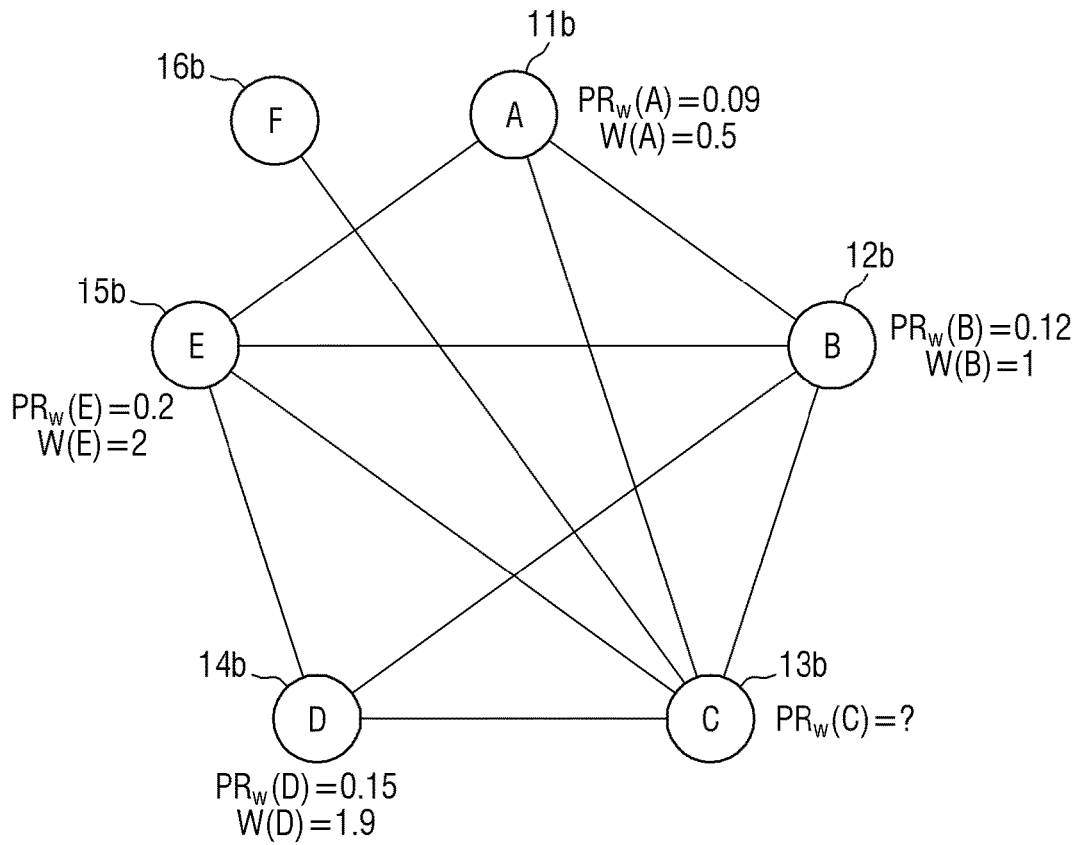
FIG. 8 illustrates a process of applying a modified PageRank algorithm in the document summarization method of FIG. 6.

FIG. 8 illustrates a process of applying a modified PageRank algorithm in the document summarization method of FIG. 6. In the process of applying the modified PageRank algorithm illustrated in FIG. 8, it is assumed that the importance of vertex C is calculated by applying the modified PageRank algorithm to the graph illustrated in FIG. 7.

Referring to FIG. 8, the document summarization apparatus 100 may calculate the importance of vertex C according to Equation (3) below:

$$PR_w(C) = (1-d) + d\left(w(A)\frac{PR_w(A)}{C(A)} + w(B)\frac{PR_w(B)}{C(B)} + w(D)\frac{PR_w(D)}{C(D)} + w(E)\frac{PR_w(E)}{C(E)}\right). \quad (3)$$

A weight $w(T_n)$ according to the relevance of each vertex A, B, D or E to a keyword, importance $PR_w(T_n)$ calculated by applying the modified PageRank algorithm, and the number $C(T_n)$ of edges attached to each vertex A, B, D or E are as shown in Table 2, and the document summarization apparatus 100 may calculate the importance of vertex C to be 0.4 as shown in Equation (4) below. Here, it is assumed that d is 0.8.

| Vertex | $w(T_n)$ | $PR_w(T_n)$ | $C(T_n)$ |
|---|---|---|---|
| A | 0.5 | 0.09 | 3 |
| B | 1 | 0.12 | 4 |
| C | 1.9 | 0.15 | 3 |
| D | 2 | 0.2 | 4 |

$$PR_w(C) = (1-d) + d\left(w(A)\frac{PR_w(A)}{C(A)} + w(B)\frac{PR_w(B)}{C(B)} + w(D)\frac{PR_w(D)}{C(D)} + w(E)\frac{PR_w(E)}{C(E)}\right) \quad (4)$$

$$= (1-0.8) + 0.8\left(0.5\frac{0.09}{3} + 1\frac{0.12}{4} + 1.9\frac{0.15}{3} + 2\frac{0.2}{4}\right)$$

$$= 0.4.$$

Figure 9:
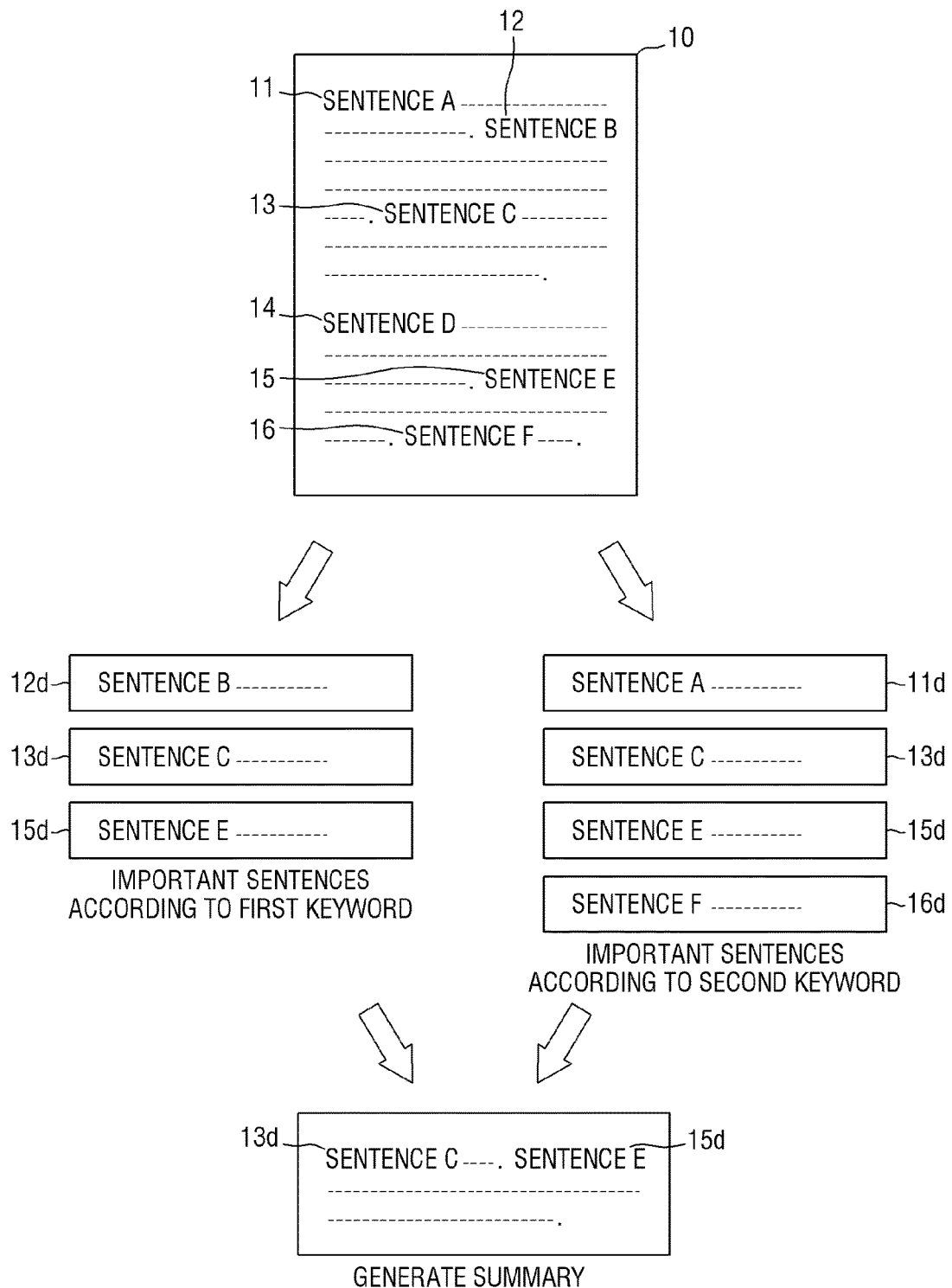
FIG. 9 is a conceptual diagram illustrating a document summarization process according to an embodiment.

A document summarization method of the document summarization apparatus 100 according to an embodiment will now be described with reference to FIGS. 9 and 10. FIG. 9 is a conceptual diagram illustrating a document summarization process according to an embodiment.

Referring to FIG. 9, the document summarization apparatus 100 receives a document 10 to be summarized from the content repository 200. The document 10 received by the document summarization apparatus 100 may include one or more sentences 11 through 16.

The document summarization apparatus 10 receives a profile of a user from the user terminal 400. Here, the profile of the user of the user terminal 400 may include, but not limited to, the user's age, gender, location information, log-in record, and search history.

The document summarization apparatus 100 selects a first keyword and a second keyword based on the profile of the user. Here, the first keyword and the second keyword are words used to apply the preference of the user of the user terminal 400 to extracting important sentences from the document 10. Therefore, the first keyword and the second keyword may be words that can express the point of view, interest or intention of the user of the user terminal 400. In addition, the first keyword and the second keyword may be, but are not limited to, different words.

The document summarization apparatus 100 extracts important sentences, e.g., sentence B 12d, sentence C 13d and sentence E 15d, from the document 10 based on the selected first keyword.

In addition, the document summarization apparatus 100 extracts important sentences, e.g., sentence A 11d, sentence C 13d, sentence E 15d and sentence F 16d, from the document 10 based on the selected second keyword.

The document summarization apparatus 100 identifies identical important sentences, e.g., sentence C 13d and sentence E 15d, among sentence B 12d, sentence C 13d and sentence E 15d extracted according to the first keyword and sentence A 11d, sentence C 13d, sentence E 15d and sentence F 16d extracted according to the second keyword.

Then, the document summarization apparatus 100 generates a summary by rearranging the identified identical important sentences, e.g., sentence C 13d and sentence E 15d based on locations of the important sentences in the document 10.

Figure 10:
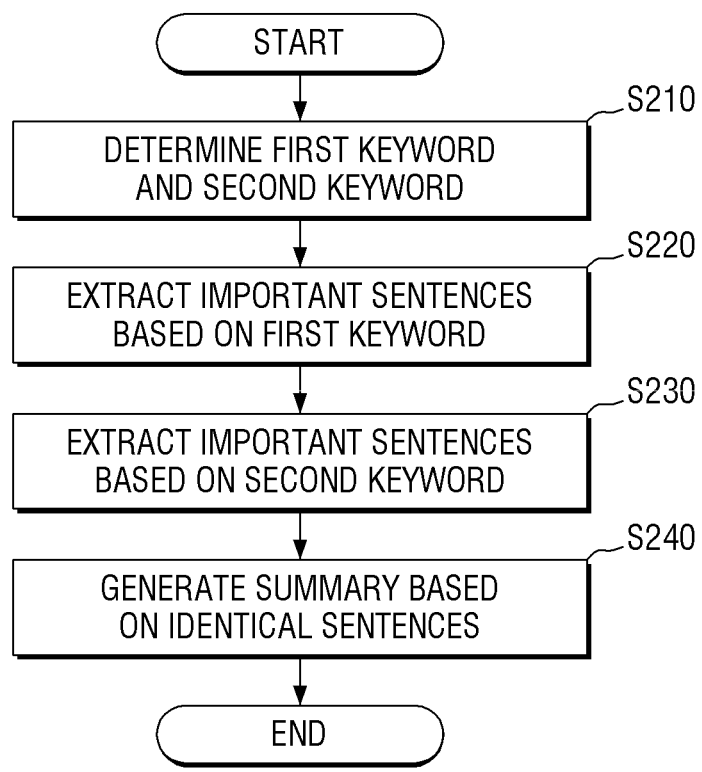
FIG. 10 is a flowchart illustrating a document summarization method according to an embodiment.

FIG. 10 is a flowchart illustrating a document summarization method according to an embodiment.

Referring to FIG. 10, the document summarization apparatus 100 selects a first keyword and a second keyword based on the profile of the user of the user terminal 400 (operation S210). Here, the first keyword and the second keyword are words used to apply the preference of the user of the user terminal 400. Therefore, the first keyword and the second keyword may be words that can express the point of view, interest or intention of the user of the user terminal 400. In addition, the first keyword and the second keyword may be, but are not limited to, different words.

The document summarization apparatus 100 extracts k important sentences from the document 10 based on the selected first keyword (operation S220). In addition, the document summarization apparatus 100 extracts m important sentences from the document 10 based on the selected second keyword (operation S230). The numbers k and m of important sentences to be extracted by the document summarization apparatus 100 may be preset in the document summarization apparatus 100 or designated by the user terminal 400 which requested the summarization of the document 10.

The document summarization apparatus 100 identifies identical important sentences among the k important sentences extracted according to the first keyword and the m important sentences extracted according to the second keyword. Then, the document summarization apparatus 100 generates a summary by rearranging the identified identical important sentences based on locations of the important sentences in the document 10 (operation S240).

In summary, the document summarization apparatus 100 extracts important sentences according to each of a plurality of keywords that can apply a reader's preference and generates a summary using only redundant sentences from among the extracted important sentences. Therefore, when a reader is interested in various fields, the document summarization apparatus 100 can generate a summary composed of important sentences related to all fields in which the reader is interested.

A document summarization method according to an embodiment will now be described.

The document summarization apparatus 100 receives a first keyword and a second keyword from the user terminal 400. Here, the first keyword and the second keyword are words used to apply the preference of the user of the user terminal 400. Therefore, the first keyword and the second keyword may be words that can express the point of view, interest or intention of the user of the user terminal 400. The first keyword and the second keyword may be different words. In addition, the user of the user terminal 400 may have, but not limited to, different preferences for the first keyword and the second keyword.

The document summarization apparatus 100 extracts k important sentences from the document 10 based on the received first keyword. Then, the document summarization apparatus 100 generates a first summary by rearranging the k important sentences extracted according to the first keyword based on locations of the important sentences in the document 10.

The document summarization apparatus 100 extracts m important sentences from the first summary based on the received second keyword. Then, the document summarization apparatus 100 generates a second summary by rearranging the m important sentences extracted according to the second keyword based on locations of the important sentences in the first summary.

In summary, when a reader has different preferences for a plurality of keywords, the document summarization apparatus 100 generates a first summary by summarizing the document 10 according to a first keyword and generates a second summary by summarizing the first summary according to a second keyword. Therefore, even if a reader has different degrees of interest in various fields, the document summarization apparatus 100 can generate a summary by reflecting the different degrees of interest of the reader.

Figure 11:
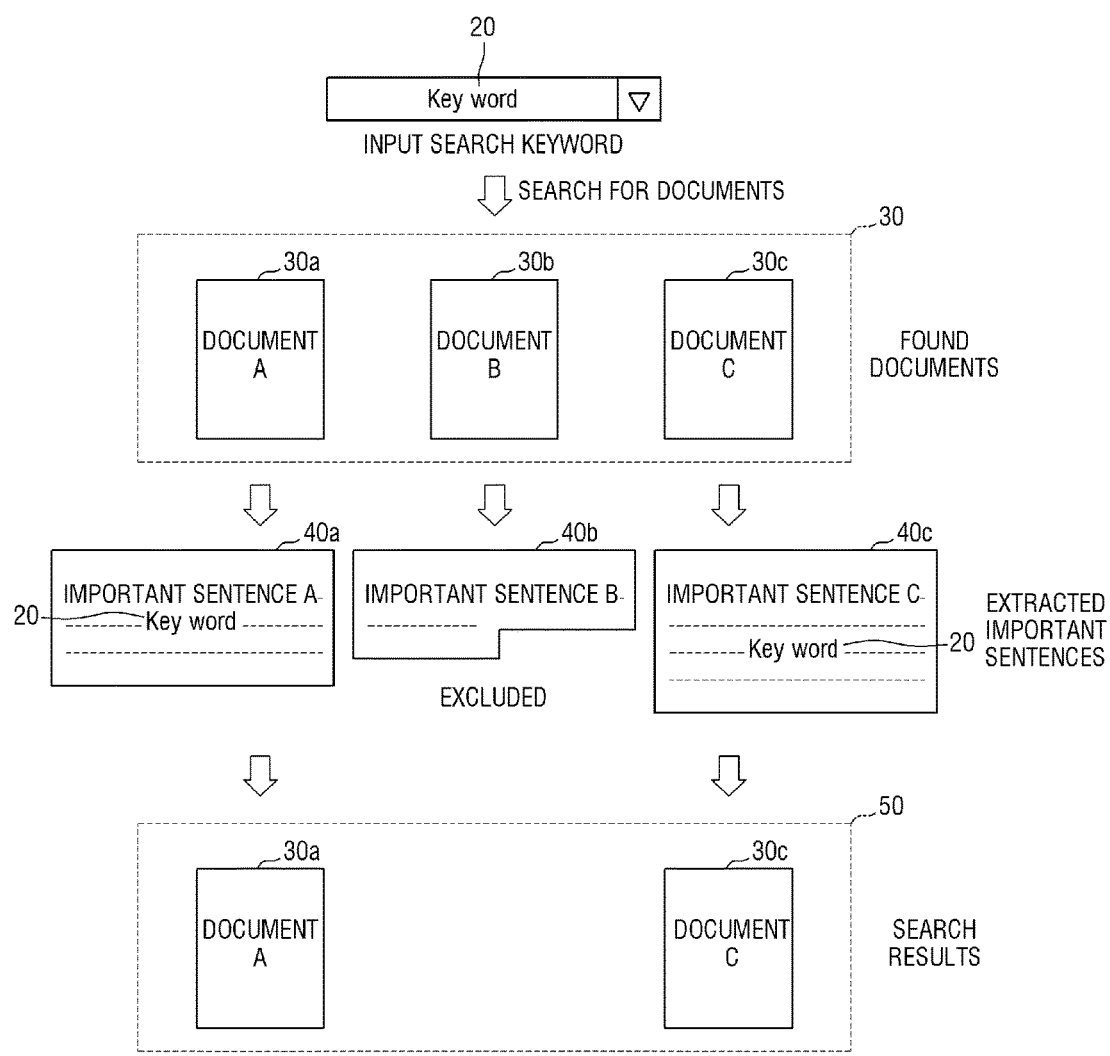
FIG. 11 is a conceptual diagram illustrating a search service provision process according to an embodiment.

A search service provision method of the search service server 310 according to an embodiment will now be described with reference to FIGS. 11 and 12. FIG. 11 is a conceptual diagram illustrating a search service provision process according to an embodiment.

Referring to FIG. 11, when a search keyword 20 is input by the user of the user terminal 400, the user terminal 400 transmits a keyword search request including the input search keyword 20 to the search service server 310.

The search service server 310 receives the keyword search request including the search keyword 20 from the user terminal 400. The search service server 310 searches for document A 30a, document B 30b and document C 30c according to the received search keyword 20.

The search service server 310 extracts important sentence A 40a, important sentence B 40b, and important sentence C 40c from the found document A 30a, the found document B 30b and the found document C 30c, respectively.

The search service server 310 reorganizes search results by excluding important sentence B 40b which does not include the search keyword 20 from the search results.

Figure 12:
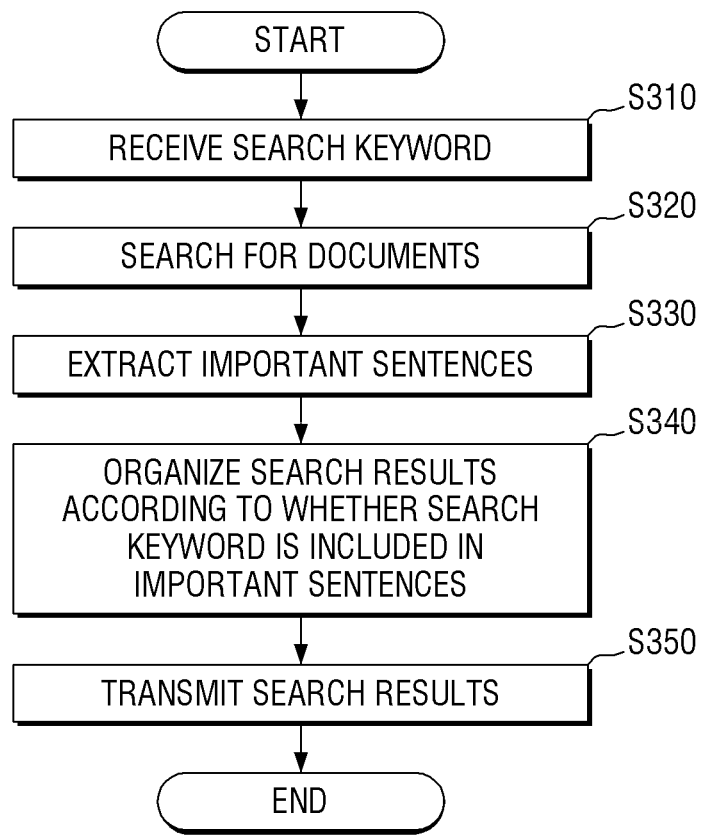
FIG. 12 is a flowchart illustrating a search service provision method according to an embodiment.

FIG. 12 is a flowchart illustrating a search service provision method according to an embodiment. Referring to FIG. 12, the search service server 310 receives a keyword search request including a search keyword 20 from the user terminal 400 (operation S310). Then, the search service server 310 searches for a document 10 according to the received search keyword 20 (operation S320).

The search service server 310 extracts important sentences from the found document 10 (operation S330). Specifically, the search service server 310 may extract important sentences from the found document 10 based on the search keyword 20. However, the inventive concept is not limited thereto, and the search service server 310 may also extract important sentences from the found document 10 regardless of the search keyword 20.

In addition, the search service server 310 may extract one important sentence from each of m found documents 10. Alternatively, the search service server 310 may extract k important sentences from one found document 10. Alternatively, the search service server 310 may extract k important sentences from each of m found documents 10. When k important sentences are extracted from a found document 10, the search service server 310 may extract the k important sentences from the found document 10 in order of highest to lowest importance.

The search service server 310 may organize search results by reflecting whether the search keyword 20 is included in the extracted important sentences. Specifically, the search service server 310 according to an embodiment may organize the search results such that a document 10 having the search keyword 20 included in its important sentences is output before a document 10 having the search keyword 20 not included in its important sentences. For example, the search service server 310 may organize the search results such that a document 10 having the search keyword 20 included in its important sentences is placed above a document 10 having the search keyword 20 not included in its important sentences. In this case, the user of the user terminal 400 can identify the document 10 having the search keyword 20 included in its important sentences before the document 10 having the search keyword 20 not included in its important sentences.

When the search keyword 20 is not included in any of k important sentences extracted from a document 10, a search service server 310 according to an embodiment may organize the search results by excluding the document 10, from which the k important sentences have been extracted, from the search results.

A search service server 310 according to an embodiment may further receive a filtering keyword from the user terminal 400. When k important sentences extracted from a document 10 include the filtering keyword, the search service server 310 may organize the search results by excluding the document 10, from which the k important sentences have been extracted, from the search results.

A search service server 310 according to an embodiment may calculate the similarity between important sentences extracted respectively from m documents 10. When a document 10 includes an important sentence whose calculated similarity is lower than a threshold value, the search service server 310 may organize the search results by excluding the document 10, from which the important sentence whose similarity is lower than the threshold value has been extracted, from the search results.

The search service server 310 according to the embodiment may calculate the similarity between important sentences using any one of Jaccard coefficient and Hamming distance. However, the inventive concept is not limited thereto, and the search service server 310 can also calculate the similarity between important sentences using any one of Tanimoto similarity and cosine similarity. The threshold value is a value indicating minimum similarity existing between two correlated sentences. In addition, the threshold value may be preset in the document summarization apparatus 100 or designated by the user terminal 400 which requested the summarization of the document 10.

The search service server 310 transmits the organized search results to the user terminal 400 (operation S350).

In summary, the search service server 310 may exclude a document which does not suit a reader's interest from search results found according to a search keyword. In addition, the search service server 310 may exclude a document which suits the reader's interest but includes a filtering keyword from the search results. Further, the search service server 310 may exclude a document which suits the reader's interest but has low similarity from the search results. Therefore, the search service server 310 can provide a customized search service that suits the reader's interest.

Figure 13:
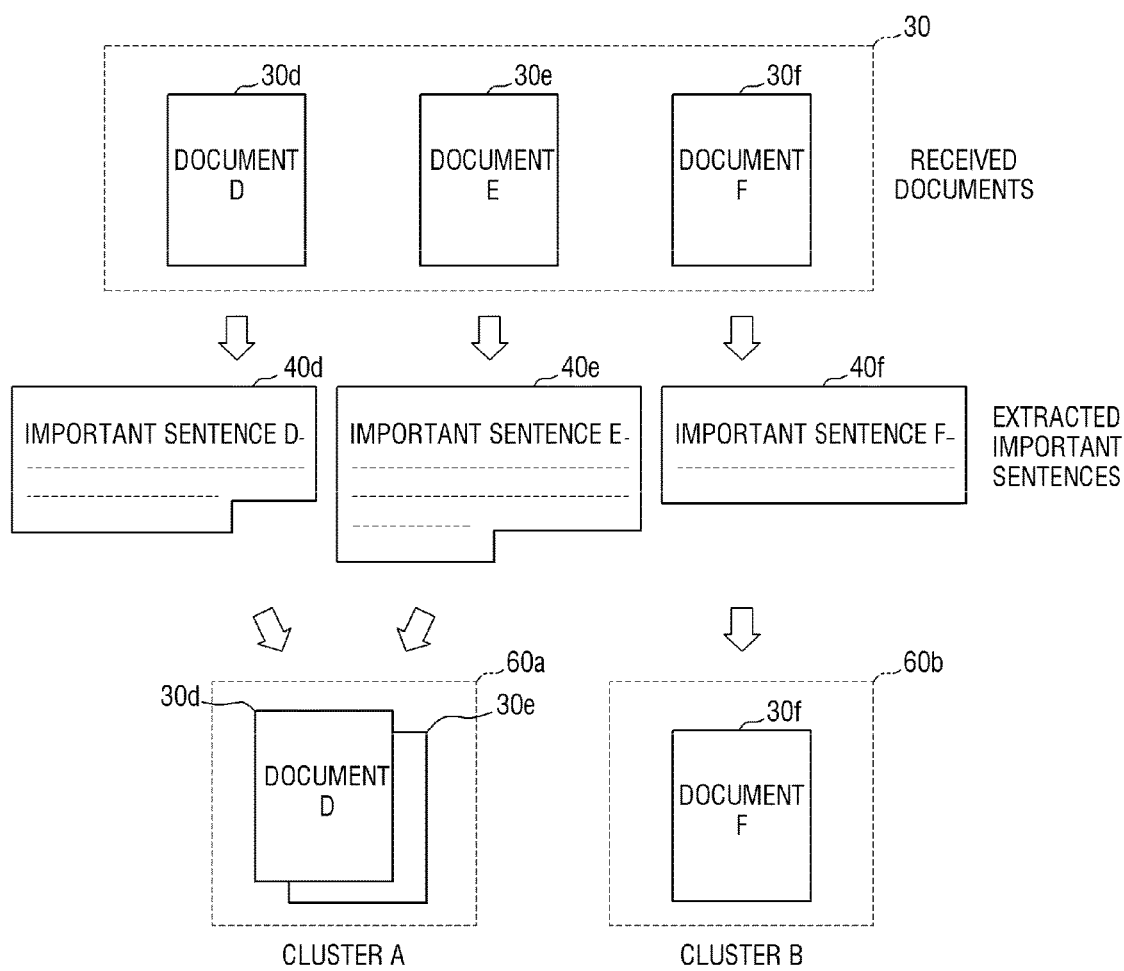
FIG. 13 is a conceptual diagram illustrating a content clustering process according to an embodiment.

A content clustering method of the content clustering server 320 according to an embodiment will now be described with reference to FIGS. 13 and 14. FIG. 13 is a conceptual diagram illustrating a content clustering process according to an embodiment.

Referring to FIG. 13, the content clustering server 320 receives a content clustering request including a cluster keyword from the content repository 200 or the user terminal 400. In addition, the content clustering server 320 receives document D 30d, document E 30e and document F 30f to be clustered from the content repository 200.

The content clustering server 320 extracts important sentence D 40d, important sentence E 40e and important sentence F 40f from document D 30d, document E 30e and document F 30f based on the cluster keyword.

The content clustering server 320 calculates the similarity between the extracted important sentence D 40d, important sentence E 40e and important sentence F 40f. In addition, the content clustering server 320 configures cluster A 60a including document D 30d and document E 30e and cluster B 60b including document F 30f based on the calculated similarity between important sentence D 40d, important sentence E 40e and important sentence F 40f.

Figure 14:
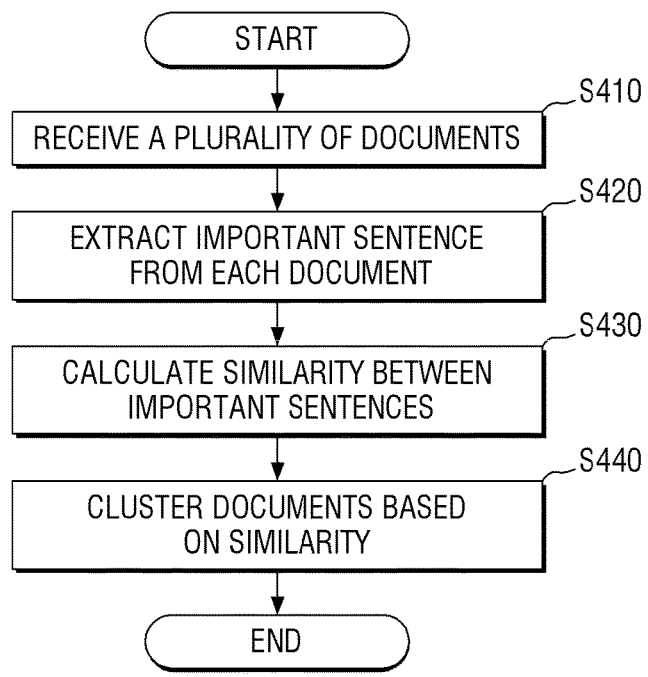
FIG. 14 is a flowchart illustrating a content clustering method according to an embodiment.

FIG. 14 is a flowchart illustrating a clustering method according to an embodiment. In the clustering method of FIG. 14, it is assumed that a plurality of documents to be clustered include a first document and a second document.

Referring to FIG. 14, when receiving a content clustering request including a cluster keyword from the user terminal 400, the content clustering server 320 receives a plurality of documents to be clustered from the content repository 200 (operation S410).

The content clustering server 320 extracts an important sentence from each of the received documents based on the cluster keyword (operation S420). Specifically, the content clustering server 320 may extract a first important sentence from the first document and a second important sentence from the second document.

The content clustering server 320 calculates the similarity between the extracted important sentences (operation S430). The content clustering server 320 according to an embodiment may calculate the similarity between important sentences using any one of Jaccard coefficient and Hamming distance. However, the inventive concept is not limited thereto, and the content clustering server 320 can also calculate the similarity between important sentences using any one of Tanimoto similarity and cosine similarity.

The content clustering server 320 clusters the documents based on the calculated similarity (operation S440). Specifically, the content clustering server 320 may determine whether the first document and the second document can be included in one cluster based on the calculated similarity.

In summary, the content clustering server 320 may cluster a plurality of documents based not simply on the similarity between the documents but on the similarity between important sentences that suit a reader's interest. Therefore, the content clustering server 320 can classify content according to the reader's interest.

The methods according to the embodiments described above with reference to FIGS. 5 through 14 may be performed by the execution of a computer program implemented as computer-readable code. The computer program may be transmitted from a first computing device to a second computing device through a network such as the Internet and then installed in the second computing device for use. Here, each of the first computing device and the second computing device may be a fixed computing device such as a desktop, a server or a workstation, a mobile computing device such as a smartphone, a tablet, a phablet or a laptop, or a wearable computing device such as a smart watch, smart glasses or a smart band.

The computer program may be designed to execute an operation of receiving a keyword, an operation of identifying each of a plurality of sentences included in a document by parsing the document, an operation of configuring a graph having each sentence as a vertex and the similarity between each pair of the sentences as a weight of an edge, an operation of calculating the importance of each sentence by applying a modified PageRank algorithm to the graph, and an operation of extracting important sentences from the document based on the calculated importance, wherein the modified PageRank algorithm is designed to reflect a weight according to the relevance of each sentence to the keyword in the importance of each sentence.

The computer program may also be designed to execute an operation of receiving a request to summarize a document from a user terminal, an operation of selecting a keyword, which reflects a user's preference, based on a profile of the user of the user terminal, an operation of extracting important sentences from the document based on the selected keyword, and an operation of generating a summary of the document based on the extracted important sentences.

In addition, the computer program may be designed to execute an operation of receiving a first keyword and a second keyword, an operation of extracting k important sentences from a document having a plurality of sentences based on the first keyword, an operation of generating a first summary based on the k important sentences, an operation of extracting m important sentences from the first summary based on the second keyword, and an operation of generating a second summary based on the m important sentences.

The computer program may be recorded in a recoding medium such as a read-only memory (CD-ROM), a digital versatile disk (DVD)-ROM, magnetic optical (MO), ZIP, a secure digital (SD) card or a flash memory.

Figure 15:
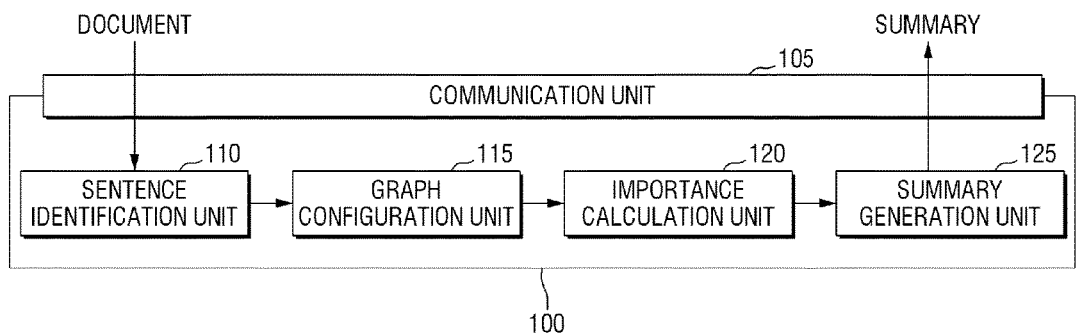
FIG. 15 is a logical block diagram of a document summarization apparatus according to an embodiment.

The configuration of a document summarization apparatus 100 according to an embodiment will now be described with reference to FIGS. 15 and 16. FIG. 15 is a logical block diagram of a document summarization apparatus 100 according to an embodiment.

Referring to FIG. 15, the document summarization apparatus 100 may include a communication unit 105, a sentence identification unit 110, a graph configuration unit 115, an importance calculation unit 120, and a summary generation unit 125.

The communication unit 105 may enable the document summarization apparatus 100 to transmit or receive data to or from an external device. Specifically, the communication unit 105 may receive a keyword from the user terminal 400 through a network and transmit the received keyword to the sentence identification unit 110. Here, the keyword may be a word used to apply the preference of each reader to extracting important sentences from a document 10. Therefore, the keyword may be a word that can express the point of view, interest or intention of each reader of the document 10.

The communication unit 105 may receive a document 10 from the content repository 200 and transmit the received document 10 to the sentence identification unit 110. The document 10 received by the communication unit 105 may include text such as Korean letters, English letters, numbers, space characters, and special characters. However, elements that can be included in the document 10 are not limited to text, and the document 10 to be summarized may also include images, charts, or OLE objects.

The communication unit 105 may transmit a summary generated by the summary generation unit 125 to the content repository 200, the application service server 300 or the user terminal 400.

The communication unit 105 according to the embodiment may transmit or receive data using one or more of a wired communication network such as Ethernet, xDSL, HFC or FTTH, a mobile communication network such as CDMA, WCDMA, GSM, HSPA or LTE, and a local area wireless communication network such as WiFi, Wimax, Wibro, Bluetooth or Zigbee.

The sentence identification unit 110 identifies each of a plurality of sentences included in the document 10 by parsing the sentence 10 received through the communication unit 105. Specifically, the sentence identification unit 110 may identify final endings included in the document 10 and identify each sentence included in the document 10 based on the identified final endings. However, the inventive concept is not limited thereto, and the sentence identification unit 110 may identify marks such as periods, question marks, commas, etc. included in the document 10 and identify each sentence included in the document 10 based on the identified marks.

The graph configuration unit 115 configures a graph having each sentence identified by the sentence identification unit 110 as a vertex and the similarity between each pair of the sentences as a weight of an edge. The graph configured by the graph configuration unit 115 may be, but is not limited to, an undirected graph.

The graph configuration unit 115 according to the embodiment may configure a graph by removing some edges from a complete graph.

Specifically, the graph configuration unit 115 configures a complete graph having each sentence identified by the sentence identification unit 110 as a vertex and all vertices connected by edges. In addition, the graph configuration unit 115 calculates the similarity between each pair of the sentences.

The graph configuration unit 115 according to the embodiment may calculate the similarity between sentences using any one of Jaccard coefficient and Hamming distance. However, the inventive concept is not limited thereto, and the graph configuration unit 115 can also calculate the similarity between sentences using any one of Tanimoto similarity and cosine similarity.

The graph configuration unit 115 assigns the calculated similarity as a weight of an edge that connects each pair of the vertices. In addition, the graph configuration unit 115 removes from the graph edges assigned weights lower than a threshold value. Here, the threshold value is a value indicating minimum similarity existing between two correlated sentences. The threshold value may be set to, e.g., one. In addition, the threshold value may be preset in the document summarization apparatus 100 or designated by the user terminal 400 which requested the summarization of the document 10.

A graph configuration unit 115 according to an embodiment may configure a graph by assigning edges to a graph composed only of vertices.

Specifically, the graph configuration unit 115 configures a graph having each identified sentence as a vertex. The graph configuration unit 115 identifies important tokens by parsing each sentence. Here, the tokens are parts for expressing substantial meanings of words included in each sentence. The tokens may be, e.g., roots or stems included in each sentence.

When the same token is included in sentences of two vertices of the graph, the graph configuration unit 115 assigns an edge between the two vertices. When all tokens included in the sentences of the two vertices of the graph are not the same, the graph configuration unit 115 does not assign an edge between the two vertices.

The importance calculation unit 120 calculates the importance of each sentence by applying a modified PageRank algorithm to the graph configured by the graph configuration unit 115. Here, the modified PageRank algorithm calculates the importance of a first vertex based on the relative importance of vertices adjacent to the first vertex, wherein a weight related to whether a keyword is included in a sentence of each vertex adjacent to the first vertex is reflected in the relative importance of each vertex adjacent to the first vertex. That is, the modified PageRank algorithm calculates the relative importance of each vertex included in the graph in view of the relevance of each vertex to the keyword.

Specifically, to calculate the importance $PR_w(A)$ of sentence A, the importance calculation unit 120 may apply Equation (5) which is a modified version of a PageRank algorithm:

$$PR_w(A) = (1-d) + d\left(w(T_1)\frac{PR_w(T_1)}{C(T_1)} + \ldots + w(T_n)\frac{PR_w(T_n)}{C(T_n)}\right), \quad (5)$$

where $T_n$ is a vertex connected to a vertex which corresponds to sentence A. In addition, $PR_w(T_n)$ is importance calculated by applying the modified PageRank algorithm to the vertex $T_n$. That is, $PR_w(T_n)$ is a PageRank value of the vertex $T_n$. The importance calculation unit 120 according to the embodiment may substitute an arbitrary number for an initial value of $PR_w(T_n)$ and iteratively perform the modified PageRank algorithm until $PR_w(T_n)$ converges on a specific value. However, an importance calculation unit 120 according to an embodiment may substitute $w(T_n)$ for an initial value of $PR_w(T_n)$ and iteratively perform the modified PageRank algorithm until $PR_w(T_n)$ converges on a specific value. In this case, the document summarizatin apparatus 100 will be able to calculate $PR_w(T_n)$ by performing the modified PageRank algorithm a reduced number of times.

$C(T_n)$ is the number of edges attached to the vertex $T_n$. In addition, d is a probability that a reader will search for other documents without being satisfied with document A. d serves as a damping factor and may be set to, but not limited to, 0.85.

In addition, $w(T_n)$ is a weight given according to the relevance of a sentence corresponding to the vertex $T_n$ to a keyword. The importance calculation unit 120 according to an embodiment may determine $w(T_n)$ according to the frequency of appearance of the keyword in the sentence corresponding to the vertex $T_n$. For example, the importance calculation unit 120 may set $w(T_n)$ to a greater value as the frequency of appearance of the keyword in the sentence corresponding to the vertex $T_n$ increases and to a smaller value as the frequency of appearance of the keyword in the sentence corresponding to the vertex $T_n$ decreases. In addition, an importance calculation unit 120 according to an embodiment may determine $w(T_n)$ according to a location at which the keyword appears in the sentence corresponding to the vertex $T_n$. For example, a total of 20 tokens may be included in the sentence corresponding to the vertex $T_n$, and the keyword may appear at a fourth location from the beginning of the sentence. In this case, the importance calculation unit 120 may set $w(T_n)$ to a value corresponding to top 20%. In addition, the importancen calculation unit 120 may linearly determine $w(T_n)$ according to the relevance of the sentence corresponding to the vertex $T_n$ to the keyword. However, the inventive concept is not limited thereto, and the importance calculation unit 120 can also non-linearly determine $w(T_n)$ according to the relevance of the sentence corresponding to the vertex $T_n$ to the keyword.

Lastly, the summry generation unit 125 generates a summary based on the importance calculated by the importance calculation unit 120. Specifically, the summary generation unit 125 may extract one important sentence with highest importance from the document 10 based on the calculated importance. The summary generation unit 125 may select sentences of vertices which are connected to a vertex of the extracted important sentence by edges. Then, the summary generation unit 125 may generate a summary using the extracted important sentence and the selected sentences.

The summary generation unit 125 may select sentences to be used to generate a summary from the sentences of the vertices, which are connected to the vertex of the one important sentence by the edges, based on any one or more of importance, similarity and length. For example, the summary generation unit 125 may select k sentences from the sentences of the vertices connected to the one important sentence by the edges in order of highest to lowest importance calculated by applying the modified PageRank algorithm. Alternatively, the summary generation unit 125 may select k sentences from the sentences of the vertices connected to the one important sentence by the edges in order of highest to lowest similarity to the one important sentence. Alternatively, the summary generation unit 125 may select k sentences from the sentences of the vertices connected to the one important sentence by the edges in order of longest to shortest sentence length.

In addition, the summary generation unit 125 may extract k important sentences from the document 10 in order of highest to lowest calculated importance. The number k of important sentences extracted by the summary generation unit 125 may be preset in the document summarization apparatus 100 or designated by the user terminal 400 which requested the summarization of the document 10. The summary generation unit 125 may generate a summary by rearranging the k extracted important sentences based on locations of the important sentences in the document 10.

Each component described above with reference to FIG. 15 may be implemented as a software component or a hardware component such as a Field Programmable Gate Array (FPGA) or Application Specific Integrated Circuit (ASIC). However, the components are not limited to the software or hardware components. A component may advantageously be configured to reside on the addressable storage medium and configured to execute on one or more processors. The functionality provided for in the components may be combined into fewer components or further separated into additional components.

Figure 16:
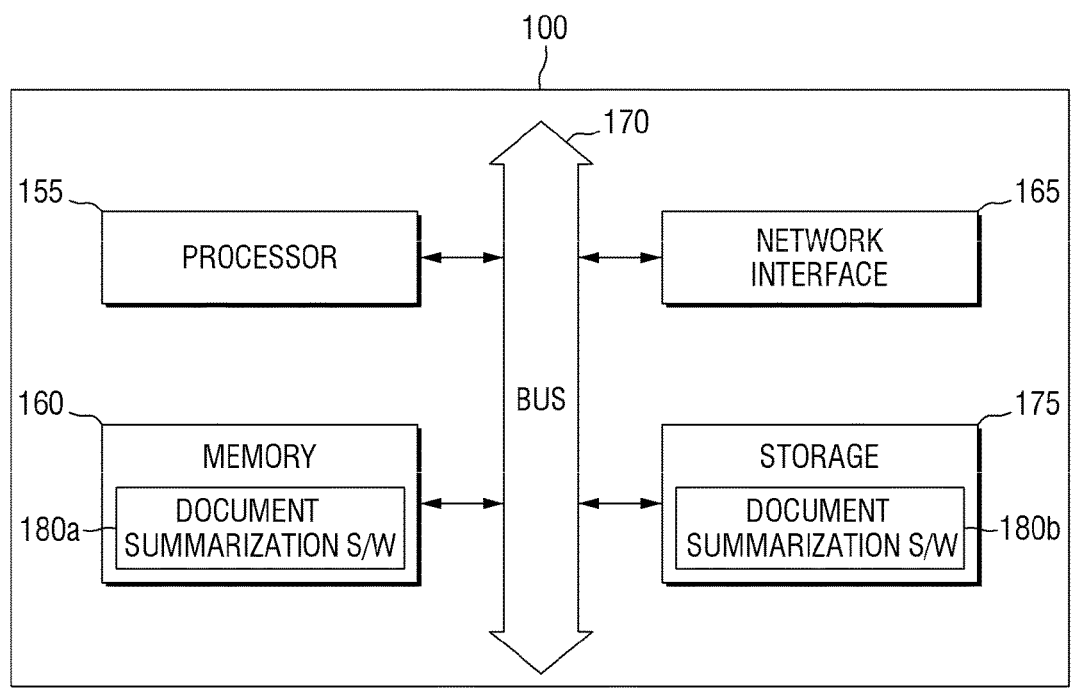
FIG. 16 illustrates the hardware configuration of the document summarization apparatus of FIG. 15.

FIG. 16 illustrates the hardware configuration of the document summarization apparatus 100 of FIG. 15. Referring to FIG. 16, the document summarization apparatus 100 may include a processor 155, a memory 160, a network interface 16, a data bus 170, and a storage device 175.

The processor 155 may include one or more central processing units (CPUs) for executing an operation. The memory 160 may be loaded with software 180a for executing a document summarization method according to an embodiment. The network interface 165 may transmit or receive data to or from any one of the content repository 200, the application service server 300, and the user terminal 400. The data bus 170 may be connected to the processor 155, the memory 160, the network interface 165 and the storage device 175 to serve as a path through which data is exchanged between the processor 155, the memory 160, the network interface 165 and the storage device 175.

The storage device 175 may store software 180b for executing a document summarization method according to an embodiment. In addition, the storage device 175 may store application programming interface (API), library or resource files used to execute the software 180b for executing the document summarization method.

More specifically, the storage device 175 may store a computer program including an operation of receiving a keyword, an operation of identifying each of a plurality of sentences included in a document by parsing the document, an operation of configuring a graph having each sentence as a vertex and the similarity between each pair of the sentences as a weight of an edge, an operation of calculating the importance of each sentence by applying a modified PageRank algorithm to the graph, and an operation of extracting important sentences from the document based on the calculated importance, wherein the modified PageRank algorithm is designed to reflect a weight according to the relevance of each sentence to the keyword in the importance of each sentence.

The storage device 175 may also store a computer program including an operation of receiving a request to summarize a document from a user terminal, an operation of selecting a keyword, which reflects a user's preference, based on a profile of the user of the user terminal, an operation of extracting important sentences from the document based on the selected keyword, and an operation of generating a summary of the document based on the extracted important sentences.

In addition, the storage device 175 may store a computer program including an operation of receiving a first keyword and a second keyword, an operation of extracting k important sentences from a document having a plurality of sentences based on the first keyword, an operation of generating a first summary based on the k important sentences, an operation of extracting m important sentences from the first summary based on the second keyword, and an operation of generating a second summary based on the m important sentences.

According to the inventive concept, the preference of a reader is taken into consideration when important sentences are extracted to generate a summary. Therefore, a customized summary that can suit the reader's point of view, interest or intention can be generated.

In addition, keyword search results are reorganized using important sentences extracted according to the preference of a reader. Therefore, a customized search service for each reader can be provided.

Further, content is clustered using important sentences extracted according to the preference of a reader. Therefore, customized clustering for each reader can be performed.

However, the effects of the inventive concept are not restricted to the one set forth herein. The above and other effects of the inventive concept will become more apparent to one of daily skill in the art to which the inventive concept pertains by referencing the claims.

What is claimed is:

1. A document summarization method, comprising:
receiving an interest keyword;
parsing a document, and identifying each of a plurality of sentences included in the parsed document;
configuring a graph having vertices and edges, wherein each vertex corresponds to each sentence, and each edge has a first weight corresponding to similarity between each pair of the sentences;
calculating importance of each sentence based on relevance between the received interest keyword and each sentence by applying a modified PageRank algorithm to the graph, wherein the modified PageRank algorithm is designed to reflect a second weight corresponding to whether the received interest keyword is included in a sentence of each vertex adjacent to a first vertex; and
extracting important sentences from the document based on the calculated importance to generate a summary of the document,
wherein the modified PageRank algorithm calculates importance of the first vertex based on relative importance of a first adjacent vertex of the first vertex and a number of edge of the first adjacent vertex,
wherein a degree to which the relative importance of the first adjacent vertex is reflected in the importance of first vertex is inversely proportional to the number of edge of the first adjacent vertex, so that the degree to which the relative importance of the first adjacent vertex is decreased as the number of edge of the first adjacent vertex is increased, and
wherein the second weight is reflected in the relative importance of vertices adjacent to the first vertex.

2. The document summarization method of claim 1, wherein the second weight is determined based on at least one of an appearance frequency and an appearance location,
wherein the appearance frequency is a frequency of appearance of the received interest keyword in the sentence of each vertex adjacent to the first vertex, and the appearance location is a location at which the received interest keyword appears in the sentence of each vertex adjacent to the first vertex.

3. The document summarization method of claim 1, wherein the configuring comprises:

configuring a complete graph having a vertex corresponding to each sentence, all vertices of the complete graph are connected by edges;

calculating the similarity between each pair of the sentences, and assigning the calculated similarity as the first weight of an edge that connects each pair of the vertices; and removing from the graph edges assigned first weights lower than a predetermined threshold value.

4. The document summarization method of claim 1, wherein the extracting comprises:

extracting k important sentences from the document in order of the highest to the lowest importance; and generating the summary by rearranging the k important sentences based on locations of the important sentences in the document.

5. The document summarization method of claim 1, wherein the extracting comprises:

extracting one important sentence from the document;

selecting sentences to be used to generate the summary, from sentences of vertices which are connected to a vertex of the extracted important sentence by edges; and generating the summary using the extracted important sentence and the selected sentences.

6. The document summarization method of claim 1, wherein the modified PageRank algorithm calculates the importance of the first vertex without using the first weight.

* * * * *